United States Patent [19]
Krishan et al.

[11] Patent Number: 5,822,692
[45] Date of Patent: Oct. 13, 1998

[54] DATA COMMUNICATION DEVICE

[75] Inventors: Baldev Krishan, Fremont; Wang Yang Chang, Cupertino, both of Calif.

[73] Assignee: Flat Connections, Inc., Fremont, Calif.

[21] Appl. No.: 706,521

[22] Filed: Sep. 4, 1996

Related U.S. Application Data

[63] Continuation of Ser. No. 174,797, Dec. 29, 1993, abandoned.

[51] Int. Cl.$^6$ ...................................................... H04Q 7/00
[52] U.S. Cl. ........................ 455/419; 455/31.3; 455/557; 340/825.44
[58] Field of Search .................................. 379/58, 59, 60; 455/186.1, 185.1, 161.2, 166.1, 31.3, 419, 557; 340/825.44, 311.1; H04Q 7/00

[56] References Cited

U.S. PATENT DOCUMENTS

| | | | |
|---|---|---|---|
| 4,525,865 | 7/1985 | Maers | 455/186.2 |
| 4,661,972 | 4/1987 | Kai | 379/57 |
| 4,682,352 | 7/1987 | Durham | 379/98 |
| 4,776,037 | 10/1988 | Rozanski, Jr. | 455/161.2 |

(List continued on next page.)

FOREIGN PATENT DOCUMENTS

| | | | |
|---|---|---|---|
| WO 90/13213 | 1/1990 | WIPO | H04Q 7/02 |
| WO 91/00676 | 1/1991 | WIPO | H04Q 7/00 |
| WO 91/11889 | 8/1991 | WIPO | H04Q 7/00 |

OTHER PUBLICATIONS

"An Introduction to PCMCIA And PC Card Technology", PCMCIA Headquarters, Sunnyvale, California, brochure, circa 1992.

"Modem Communications: A Modem Primer", Multitech Systems, Inc., Mounds View, Minnesota (Sep. 1992).

R.H. Tridgell, "Radiopaging and Messaging", in Mobil Information Systems, Artech House, Inc. (J. Walker, ed. 1990), pp. 16–57.

"Rockwell RC96ACL/RC144ACL Modem and RC969ACi/RC144ACi Modem Designer's Guide", Rockwell International, digital Communication Divison (Apr. 1993).

"ICs For Communications, PLL–Frequency Synthesizer with 3–Wire Bus TBB 206, Data Sheet", Siemens Aktiengesellschaft (1992).

"PCF5001 POCSAG Paging Decoder", Data Sheet, Philips Semiconductors (Jun. 1993).

"Q. 12–1/8, S.P. 12A/8, Radio Paging Systems", CCIR Radio Paging Code Standards Group (1980).

"Recommendation 539–1, Technical and Operational Characteristics of Future International Radio–Paging Systems", CCIR Radio Paging Code standards Group (1982).

"Report 499–3, Radio–Paging Systems", CCIR Radio Paging Code Standards Group (1982).

"Recommendation 584, Standard Codes and Formats For International Radio Paging", CCIR Radio Paging Code Standards Group (1982).

"Report 900, Radio–Paging Systems", CCIR Radio Paging Code Standards Group (1982).

*Primary Examiner*—Thomas L. Stoll
*Attorney, Agent, or Firm*—Fish & Neave; Nicola A. Pisano; Michael J. DeHaemer

[57] ABSTRACT

A data communication device is provided that can be connected to a host computer to add communications capabilities to the host. The data communication device contains a user-programmable multi-channel pager/e-mail receiver that has both numeric and alphanumeric capabilities and a modem. Further, the data communication device may be used with the host as a telephone set or a telephone answering machine. When the device is used as a telephone answering machine and a user desires to retrieve stored messages, the local telephone office is prevented from placing a fast busy signal on the telephone line. The user can update the firmware of the data communication device, or it can be updated remotely by downloading a new firmware version using the pager/e-mail receiver.

20 Claims, 18 Drawing Sheets

U.S. PATENT DOCUMENTS

| | | | |
|---|---|---|---|
| 4,845,491 | 7/1989 | Fascenda et al. | 340/825.44 |
| 4,847,863 | 7/1989 | Watson | 375/8 |
| 4,887,311 | 12/1989 | Garner et al. | 455/186.1 |
| 5,001,775 | 3/1991 | Hayashi et al. | 455/186.1 |
| 5,005,013 | 4/1991 | Tsukamoto et al. | 358/241 |
| 5,012,234 | 4/1991 | Dulaney et al. | 340/825.44 |
| 5,040,204 | 8/1991 | Sasaki et al. | 379/61 |
| 5,043,721 | 8/1991 | May | 340/825.44 |
| 5,050,041 | 9/1991 | Shafi | 361/391 |
| 5,052,049 | 9/1991 | Andros et al. | 340/825.44 |
| 5,073,767 | 12/1991 | Holmes et al. | 340/311.1 |
| 5,077,828 | 12/1991 | Waldroup | 455/34.1 |
| 5,206,855 | 4/1993 | Schwendeman et al. | 340/825.44 |
| 5,262,769 | 11/1993 | Holmes | 455/186.1 |
| 5,281,962 | 1/1994 | Vanden Heuvel et al. | 340/825.44 |
| 5,302,947 | 4/1994 | Fuller et al. | 340/825.44 |
| 5,337,044 | 8/1994 | Folger et al. | 340/825.44 |
| 5,337,314 | 8/1994 | Hoff et al. | 455/32.1 |
| 5,361,296 | 11/1994 | Reyes et al. | 379/96 |
| 5,546,077 | 8/1996 | Lipp et al. | 340/825.44 |

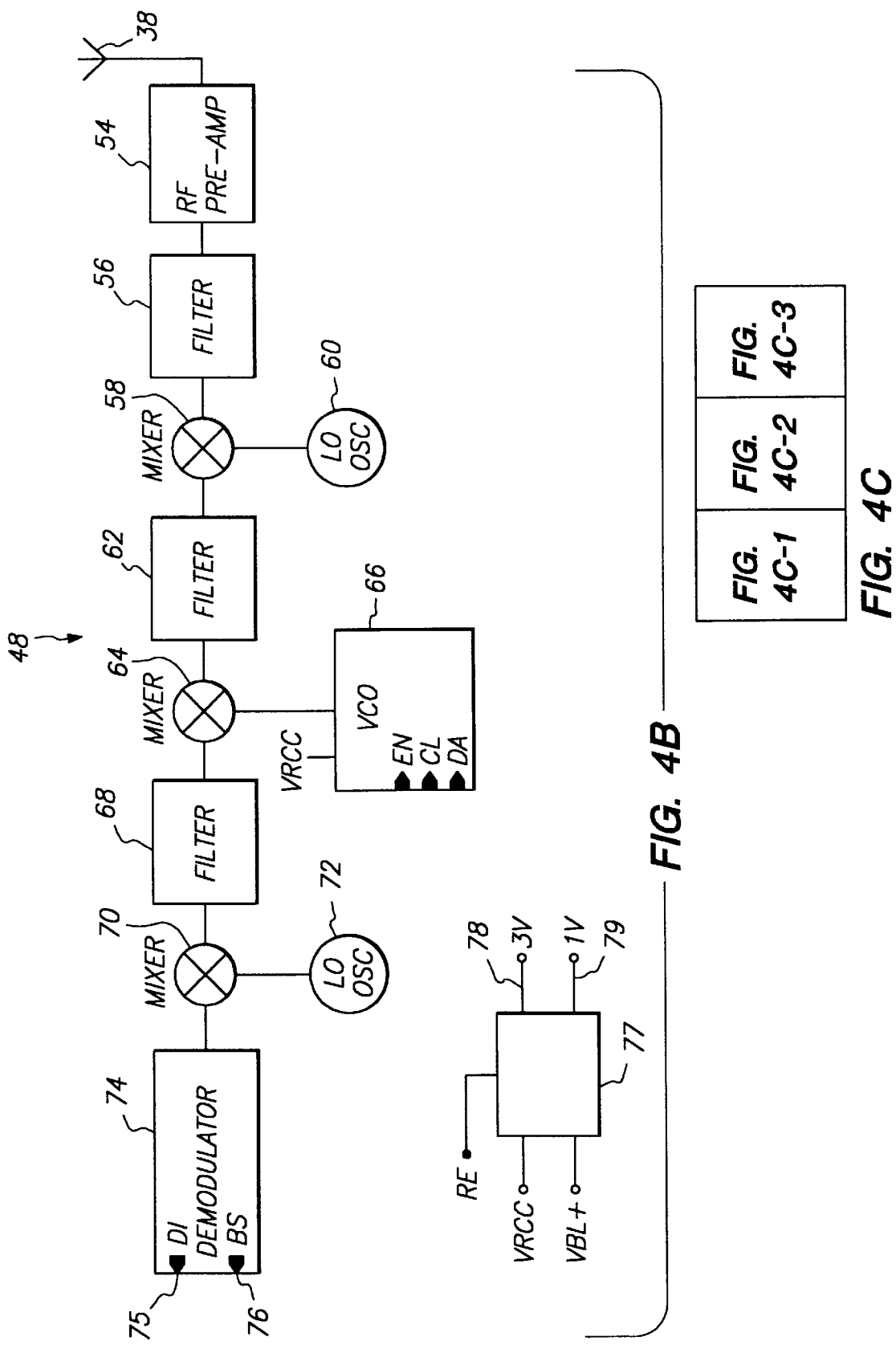

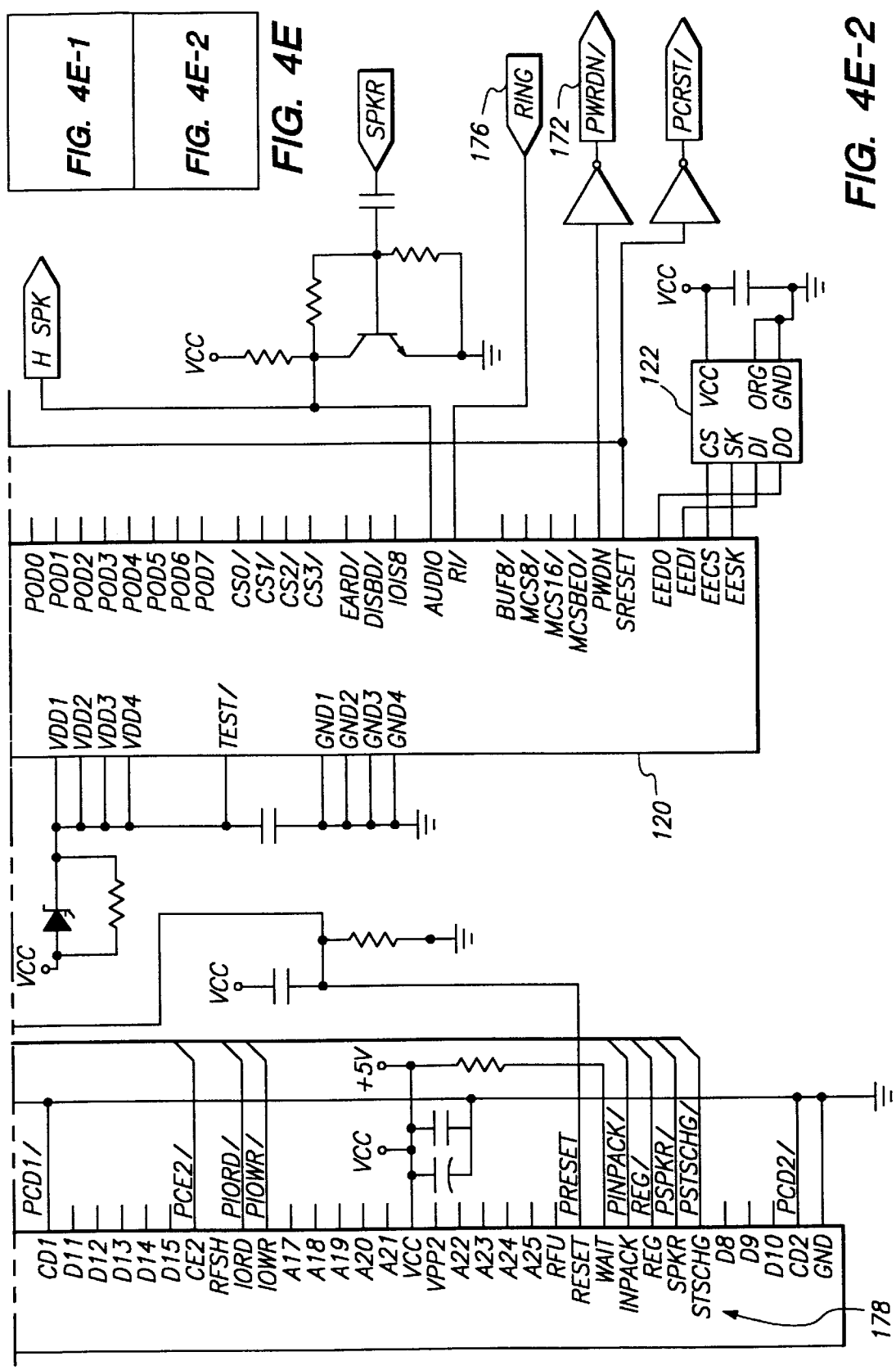

DATA COMMUNICATION DEVICE

This is a continuation of application Ser. No. 08/174,797, filed Dec. 29, 1993, now abandoned entitled DATA COMMUNICATION DEVICE.

BACKGROUND OF THE INVENTION

This invention relates to circuitry for providing computers and similar electronic devices with enhanced communications capabilities. More particularly, the invention relates to electronic devices containing modem, pager, and electronic mail communication circuitry.

Communication devices such as pagers and electronic mail receivers, which allow people to be contacted even when away from a telephone, are becoming increasingly popular. Callers can send short numeric or alphanumeric messages to a service subscriber. A typical numeric paging message is the telephone number of the caller. Wireless electronic mail ("e-mail") services allow the user to receive longer alphanumeric messages. Paging and e-mail services are provided on 120 channels in the 929.0125 to 931.9875 MHz frequency range, spaced at 25 KHz intervals. Each channel is typically dedicated to a single service. In order to use a particular service, a pager or e-mail receiver that is capable of receiving messages on the appropriate channel is required. Pagers and e-mail receivers are generally only capable of receiving messages on a single channel. After the user selects a particular service, a technician adjusts the pager receiver or e-mail receiver so that the receiver is tuned to the channel used by that service. However, even if the user wishes to use a different service, it is not possible for the user to tune the receiver to the appropriate channel. It would therefore be desirable to provide a pager or e-mail receiver that could be tuned to different channels by the user. It would also be desirable to provide a device in which more than one channel could be monitored by a single receiver. Further, it would be desirable if messages could be downloaded to a personal computer or other host device. Because previously known paging and e-mail devices have not been compatible with the personal computer card specifications that have been set forth by the Personal Computer Memory Card International Association (PCMCIA) of Sunnyvale, Calif., it has not been possible to connect such devices to a host personal computer using a PCMCIA slot. It would therefore be desirable to provide a pager or e-mail device that can interface with a personal computer or similar electronic device using a PCMCIA connector.

As is well-known, computers can communicate over telephone lines using modems. If a user wishes to add e-mail (or paging) and modem capabilities to a computer system, it has generally been necessary to add both e-mail (or paging) and modem units. Because this requires the use of two separate communication devices, two computer slots or communication ports must be used. It would therefore be desirable to provide a compact data communication device that contains modem circuitry and paging and e-mail circuitry, so that modem, paging, and e-mail features can be provided in a single device.

Further, with conventional modems, pagers, and e-mail devices, it has generally not been possible for the user to update the device firmware (software stored in a fixed form such as read-only memory (ROM)). As a result, users have not been able to benefit when newer versions of firmware have become available. It would therefore be desirable to provide a data communication device that allows the user to update firmware.

It has previously been known to provide circuitry that allows a computer to be used as a telephone answering machine. However, when a telephone headset is off-hook for a certain period of time (in the absence of dialing activity) the local telephone office places a "fast busy" or beeping tone on the telephone line. This signal may interfere with the ability of the user to listen to messages being retrieved from a computer-based answering machine using a conventional headset or handset. It would therefore be desirable to be able to prevent the local telephone office from placing the beeping tone on the telephone line when messages are being retrieved.

SUMMARY OF THE INVENTION

In view of the foregoing, it is an object of this invention to provide a paging and e-mail device having multiple user-selectable channels.

It is a further object of the invention to provide a data communication device that has paging and e-mail circuitry and PCMCIA interface circuitry for supporting data communications between the paging and e-mail circuitry and a host computer.

It is also an object of the invention to provide a data communication device that has paging, e-mail, and modem circuitry and that uses only a single slot or port of a host computer.

It is also an object of the invention to provide a data communication device having radio frequency paging and e-mail circuitry that executes firmware instructions that are loaded in a program memory. The firmware version loaded into the program memory can be updated directly through an interface with a host computer, using a telephone line and the modem circuitry or wirelessly using the radio frequency paging and e-mail circuitry.

It is also an object of the invention to provide a method for preventing a local telephone office from placing a fast busy signal on a telephone line when a user employs a telephone headset that is powered by the telephone line for retrieving voice mail messages from a computer-based telephone answering machine.

These and other objects of the invention are accomplished in accordance with the principles of the present invention by providing a data communication device that can be connected to a host computer or similar electronic device to add communications capabilities to that host. The data communication device contains user-programmable multi-channel paging and e-mail circuitry that allows the user to scan more than one pager or e-mail channel. The data communication device also contains modem circuitry that supports data and voice capabilities. The voice capabilities of the modem circuitry allow the data communication device to be used with a host as a telephone answering machine.

The modem circuitry within the data communication device supports industry-standard modulation and control standards, as well as both data and facsimile transmissions. Radio frequency circuitry within the device can receive both paging and wireless e-mail messages. The data communication device is preferably compatible with the PCMCIA Type II Extended PC card standard, so that it is compact enough to be carried separately from the host when a user desires to use the device as a stand-alone pager/e-mail receiver.

The user can update the firmware of the data communication device directly using the host computer, or it can be updated remotely, for example by the manufacturer, by downloading a new firmware version using the radio frequency paging circuitry. The user can update the firmware by downloading new firmware from the host, or by connecting the data communication device to a central computer system with the modem, allowing the central computer system to transfer the new firmware version to the data communication device.

The data communication device includes circuitry so that when the data communication device is used with the host as a computer-based answering machine, the local telephone office can be prevented from placing a fast busy signal on the telephone line while the user retrieves messages from the host. When the user retrieves a stored message from the host, the modem circuitry within the data communication device places a telephone call to a special "voice mail assistant" number. The call is answered by an automatic telephone answering machine, which remains silent. Because the call is completed, the local telephone office does not place the beeping tone on the telephone line, so that the user can retrieve voice mail messages without interference.

Further features of the invention, its nature and various advantages will be more apparent from the accompanying drawings and the following detailed description of the preferred embodiments.

BRIEF DESCRIPTION OF THE DRAWINGS

FIGS. 4B–4H are, respectively, block diagrams of illustrative embodiments of receiver, radio frequency controller, telephone interface, PCMCIA interface, modem data pump, modem controller and power management circuitries constructed in accordance with the present invention.

DETAILED DESCRIPTION OF THE INVENTION

The detailed description of the present invention is set forth as an overview of the invention, describing the basic structure and capabilities of a device constructed in accordance with the present invention. The overview is followed by detailed summaries describing the component circuitries and the operation and interrelation of those circuitries. Various advantages and features realizable using the present invention are then presented.

For convenience, the detailed description is set forth in the following sections.

I. Overview Of The Invention
II. Radio Frequency Circuit
A. Receiver Circuitry
B. Radio Frequency Controller
III. Radio Frequency Circuit Operation
IV. Telephone Interface Circuitry
V. Interface Circuitry
VI. Modem Circuitry
A. Modem Data Pump
B. Modem Controller
VII. Operation Of Modem Circuitry
A. Modem Mode
B. Voice Mode
VIII. Power Management Circuitry
IX. Updating Of Device Firmware

I. Overview Of The Invention

Figure 1A:
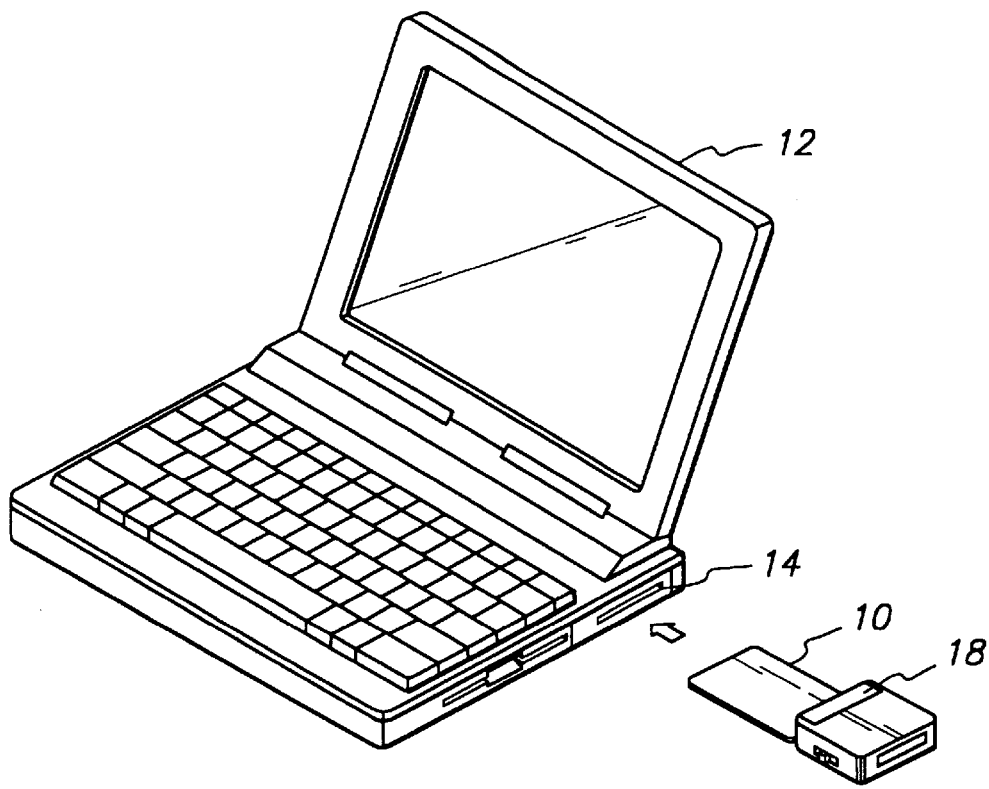
FIGS. 1A and 1B are perspective views of alternative illustrative embodiments of a host computer and the data communication device of the present invention.
Figure 1B:
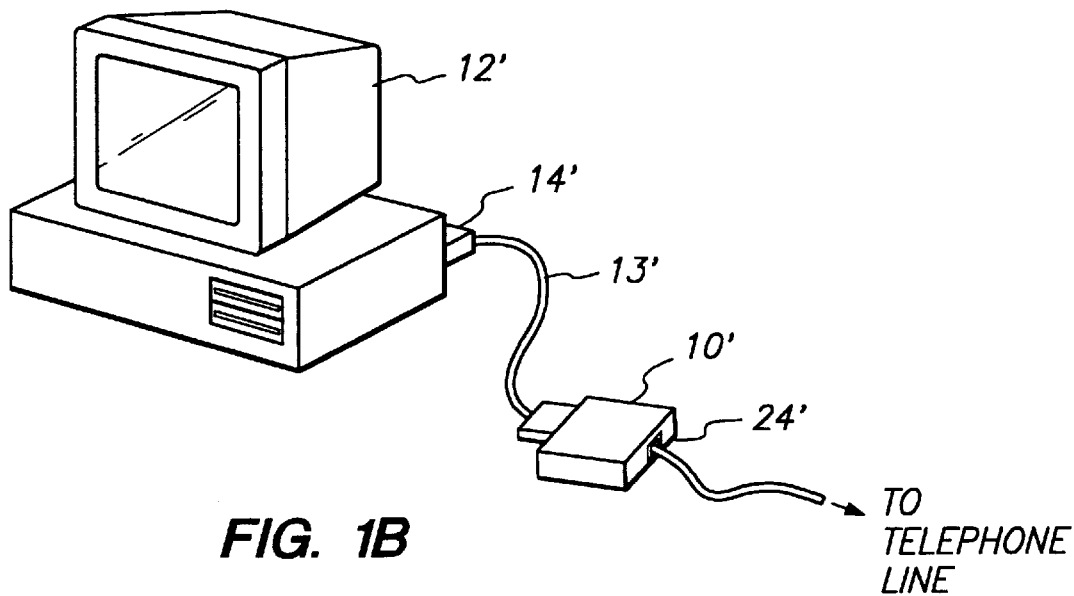

Alternative embodiments of data communication device 10 and 10' are described with respect to FIGS. 1A and 1B. Referring first to FIG. 1A, data communication device 10 contains modem circuitry and radio frequency paging/wireless e-mail circuitry for providing a variety of communication functions, as described hereinbelow. Data communication device 10 conforms to the Type II Extended Personal Computer (PC) Card specification promulgated by the Personal Computer Memory Card International Association (PCMCIA) of Sunnyvale, Calif., so that data communication device 10 can be connected to a personal computer, personal communicator, or other electronic device having a PCMCIA slot, such as notebook computer 12 with slot 14.

Alternatively, as shown in FIG. 1B, data communication device 10' can be configured for connection to a communications port of a personal computer, such as RS-232 serial port 14' of personal computer 12'. Data communication device 10' may be connected to personal computer 12' via standard communications cable 13'. To employ the modem functions of data communications device 10', a telephone line may be connected to device 10' via telephone jack 24'. Other than having a PCMCIA interface, the embodiment of data communication device 10' includes all of the features of data communication device 10 of FIG. 1A, which is described in detail below.

Figure 2A:
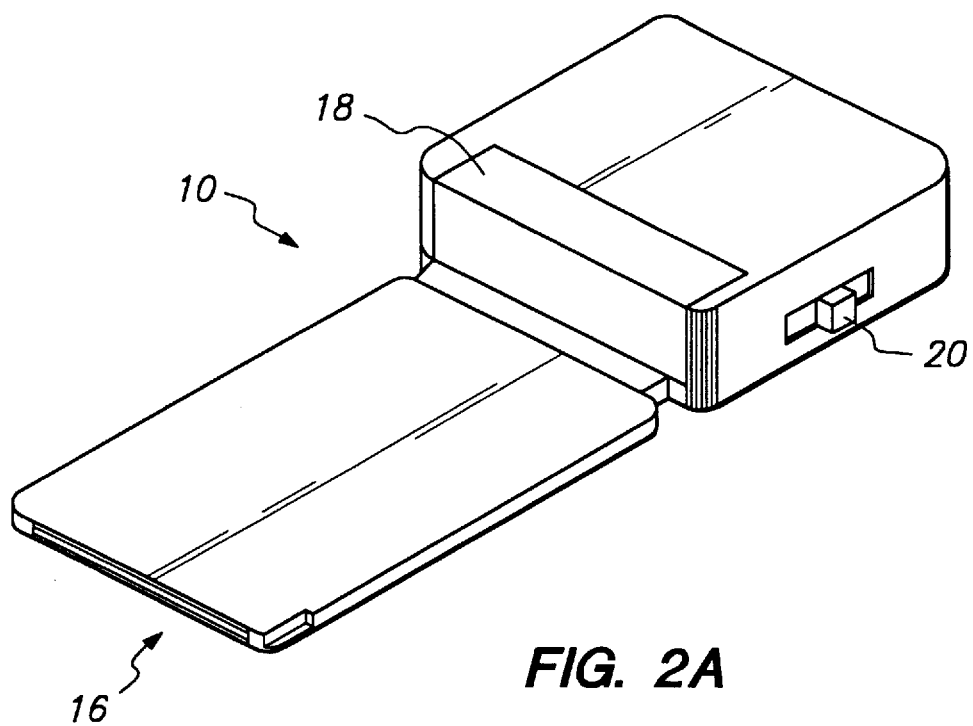
FIGS. 2A and 2B are perspective views of the illustrative embodiment of the data communication device of FIG. 1A.
Figure 2B:
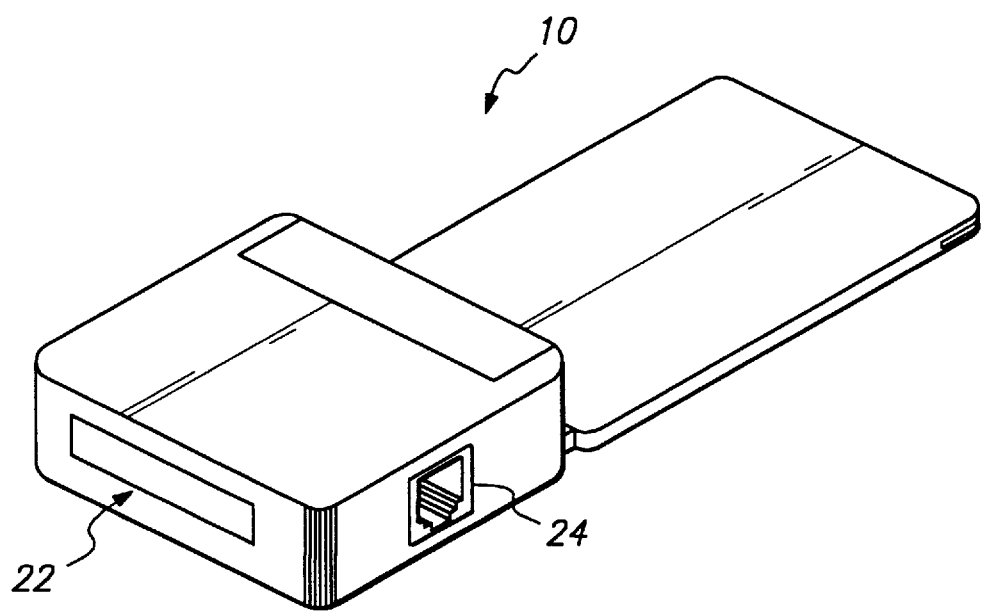

Referring now to FIGS. 2A and 2B, data communication device 10 includes 68 pin PCMCIA edge connector 16, battery compartment 18, three-position switch 20, liquid crystal display 22 and telephone jack 24. PCMCIA edge connector 16 is coupled to interface circuitry within data communications device 10 for enabling bi-directional data transfer between device 10 and host computer 12. Battery compartment 18 houses an AA battery (not shown) for powering the internal circuitry of device 10 when data communication device 10 is not connected to a host device such as notebook computer 12. Three-position switch 20 preferably includes "on" and "off" positions, as well as an additional "momentary" position that enables the circuitry to be briefly activated, for example, to scroll through paging messages on liquid crystal display ("LCD") 22. Telephone jack 24 enables data communication device 10 to be connected to a conventional telephone line when it is desired to transmit or receive information using the modem circuitry.

Figure 3:
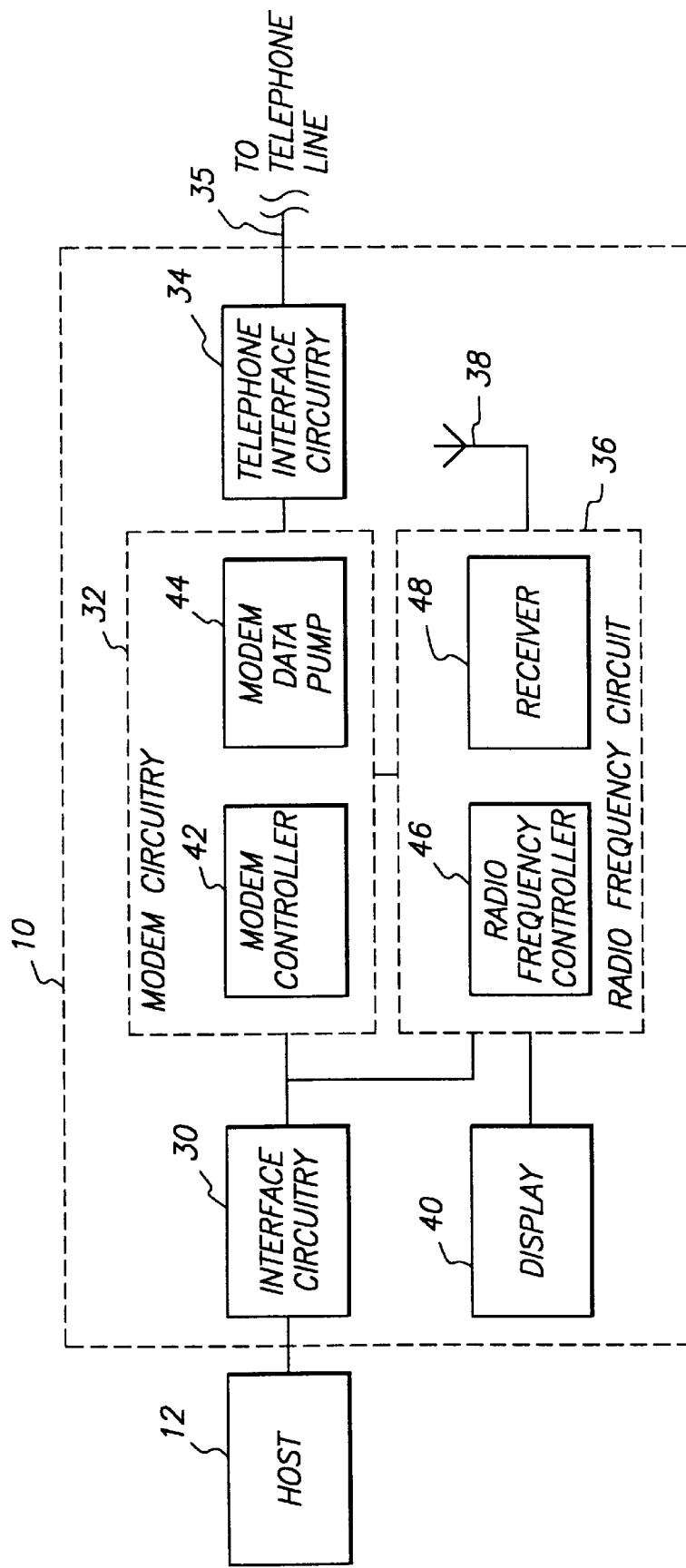
FIG. 3 is a schematic block diagram of a host and the data communication device of the present invention.

Referring now to FIG. 3, data communication devices 10 and 10' both contain interface circuitry 30, modem circuitry 32, telephone interface circuitry 34, radio-frequency circuitry 36, antenna 38 and display circuitry 40. Interface circuitry 30 connects modem circuitry 32 and radio frequency circuitry 36 to host 12 or 12', which may be a conventional desktop computer, a portable personal computer, or other suitable data processing device as described hereinabove with respect to FIGS. 1A and 1B. Preferably, interface circuitry 30 contains a standard integrated circuit for performing interfacing functions and a universal asynchronous receiver transmitter (UART) for serial to parallel and parallel to serial data conversion.

Modem circuitry 32 includes modem controller circuitry 42 and modem data pump 44, which enable communication via telephone line 35. Modem circuitry 32 is based on a standard set of integrated circuits that is compatible with most of the widely used modem modulation and control standards. Preferably, modem circuitry 32 has a send and receive facsimile capability and a voice capability, which enables the host and data communication device 10 to function as a telephone answering machine. Modem circuitry 32 also permits a user to either use the telephone set connected to the telephone line or to connect a separate telephone headset to the telephone line to retrieve stored voice messages.

Radio frequency circuitry 36 includes radio-frequency controller 46 and receiver 48 that perform functions related to wireless communications. Radio frequency circuitry 36 receives paging and electronic mail (e-mail) messages via antenna 38, decodes paging messages and displays them on display 40. Paging and e-mail messages received by radio frequency circuitry 36 may also be provided for display or processing to the host.

Modem circuitry 32 and radio frequency circuitry 36 may contain individual controllers (either microprocessors or a microcontrollers) or a single controller that is capable of providing both telephone line and wireless functions.

The foregoing circuit components enable the data communication device of the present invention to provide a number of modem/paging/e-mail capabilities not available with previously known devices. Data communication device 10 performs the functions of conventional pagers/e-mail receivers. It also provides a compact device offering full fax/modem and telephone answering capabilities for a host device.

Moreover, as described hereinbelow, the combination of circuitries in data communication device 10 provides a "tunable" pager/wireless e-mail receiver, so that the user may select the paging/e-mail channel monitored by data communication device 10 using the data input interface of the host device, for example the keyboard of computer 12. Data communication device 10 may even be configured to alternately monitor or poll more than one pager/e-mail channel, so as to detect data transmittal on either one of two pager/e-mail channels or one pager channel and one e-mail channel.

The combination of circuitries provided in data communication device 10 also enables remote updating of the firmware employed device 10. In particular, as described in greater detail hereinbelow, the firmware for data communication device 10 is preferably stored in electrically erasable programmable read-only memories (EEPROMs). This firmware may be updated, for example, for updates in the modem protocol, using instructions passed to data communication device 10 using host computer 12 and the modem capability of device 10. Alternatively, firmware update instructions may be received by data communication device 10 using radio frequency circuitry 36, thereby enabling firmware updates to be provided to the user wirelessly.

Data communication device 10 also includes power management circuitry, described in greater detail below, that enables device 10 to provide paging and e-mail reception capabilities with minimal power consumption. The power management circuitry of the present invention also enables data communication device 20 to switch automatically to power supplied by the host via the PCMCIA interface to conserve battery power.

Figures 1, 4A:
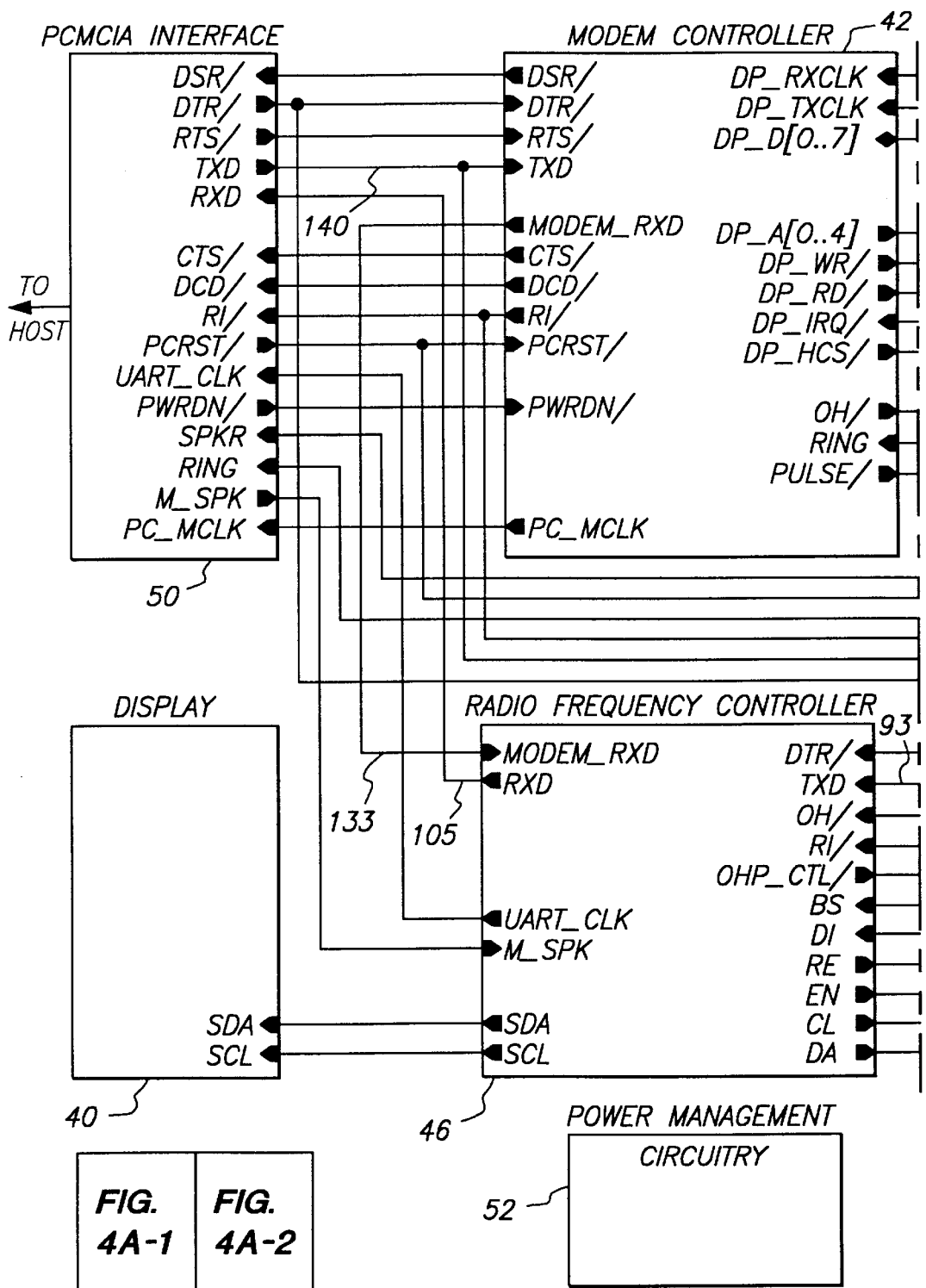
FIG. 4A is a circuit diagram of an illustrative embodiment of the present invention.
Figures 2, 4A:
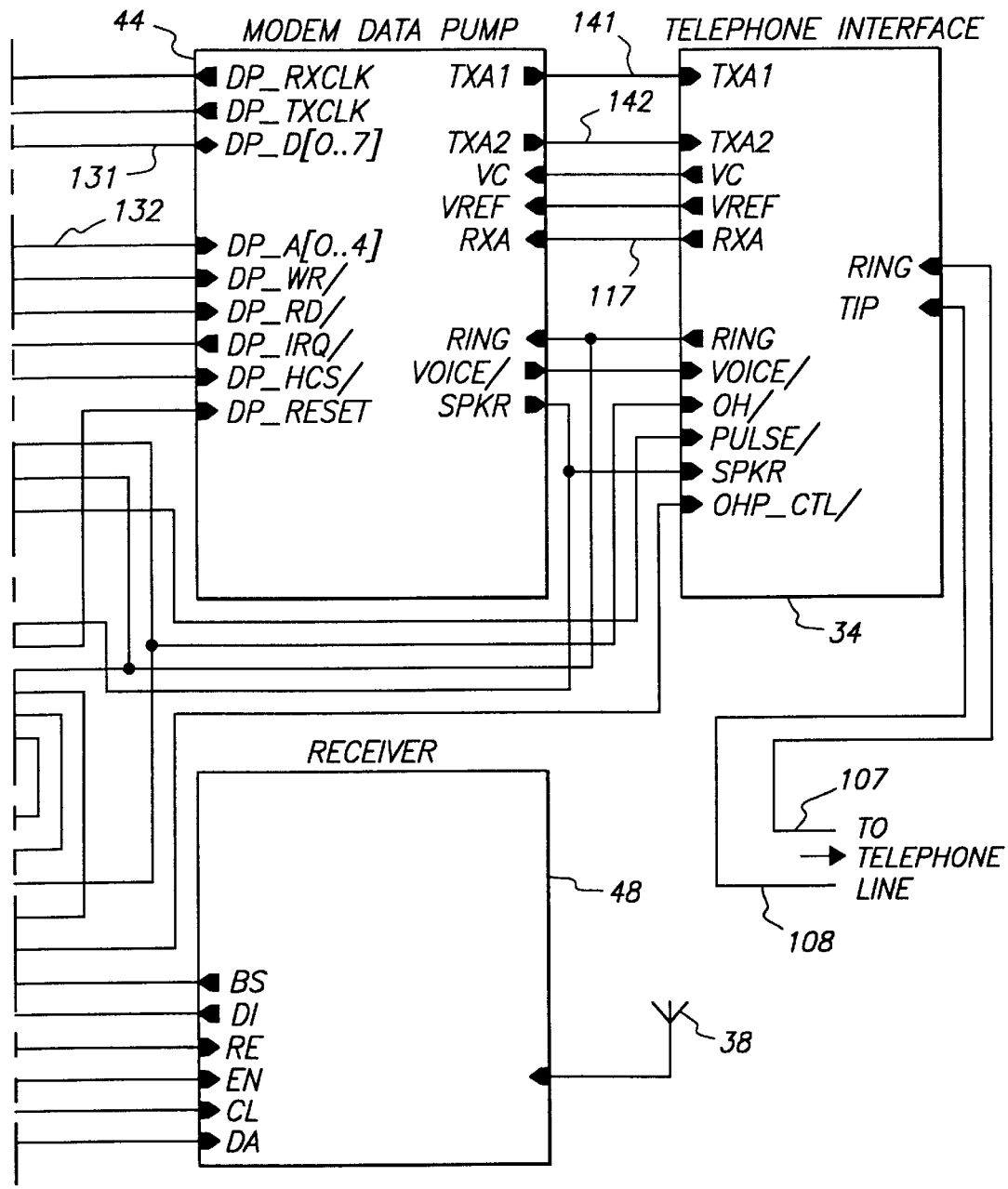

With reference to FIG. 4A, an illustrative schematic block diagram for data communication device 10 is described. PCMCIA interface 50 performs the functions of interface circuitry 30 of FIG. 3, while modem controller 42, modem data pump 44, telephone interface 34, radio frequency controller 46, receiver 48, antenna 38 and display 40 are indicated by like numerals as in FIG. 3 and perform the functions ascribed hereinbefore to those circuitries. FIG. 4A also includes in schematic form power management circuitry 52.

Set forth hereinbelow is a description of the circuitries employed in illustrative embodiments of the foregoing components, as well as a description of the operation, interrelation and various advantages of those circuitries.

II. Radio Frequency Circuit

A. Receiver Circuitry

Referring to FIG. 4B, an illustrative block diagram of the receiver circuitry of the present invention is described. Receiver includes radio frequency pre-amplifier 54, filters 56, 62 and 68, mixers 58, 64 and 70, local oscillators 60 and 72, demodulator 74, voltage controlled oscillator circuitry 66, and voltage regulator circuit 77.

Antenna 38 is used to receive radio frequency signals in the 929.0125 to 931.9875 MHz frequency range, which comprises 120 separate pager and e-mail channels. After passing through radio frequency pre-amplifier circuitry 54, and filter 56, the input signal is reduced using conventional heterodyne techniques to a first intermediate frequency of 55.4125 to 58.3875 MHz by mixing the signal from filter 56 with a 873.6 MHz signal from local oscillator 60 at mixer 58. After passing through filter 62, the signal is again reduced to a second intermediate frequency of 10.7125 MHz with a bandwidth of approximately 200 kHz at mixer 64. The second intermediate frequency signal passes through filter 68 and is combined with signals from phased-locked local oscillator 72 at mixer 70, producing a final intermediate frequency signal of 455 kHz with a bandwidth of 10–15 kHz. This signal is demodulated by demodulator 74 and made available to radio frequency controller 46.

Voltage controlled oscillator circuitry 66 generates signals in a frequency range of 44.7 to 47.675 MHz in 25 kHz increments, each of which corresponds to one of the 120 separate pager and e-mail channels. Voltage controlled oscillator circuitry 66 preferably comprises a frequency synthesizer integrated circuit, for example, part No. TBB206, available from Siemens Components Corporation of Cupertino, Calif.

B. Radio Frequency Controller

Figures 1, 4C:
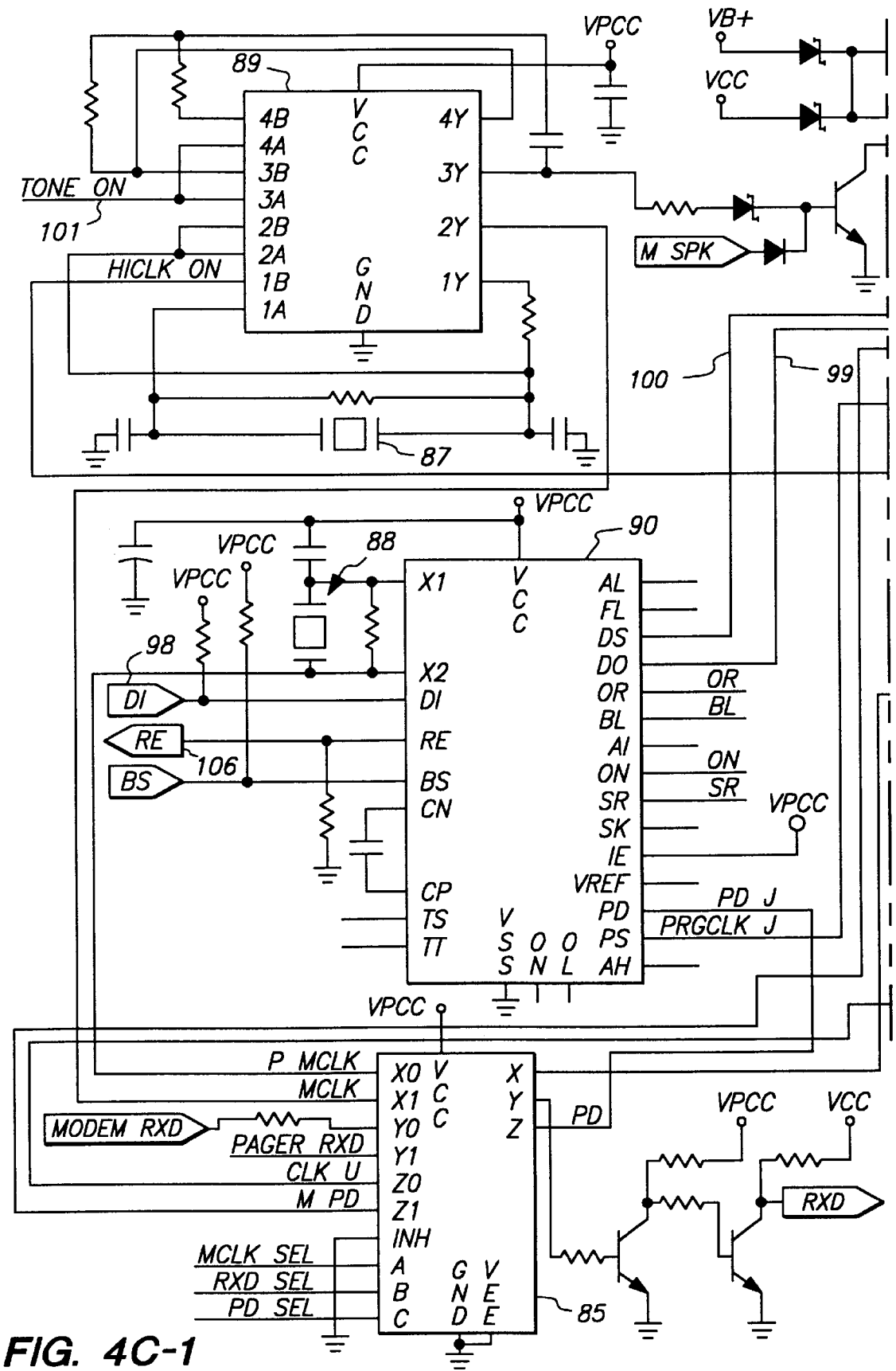
Figures 2, 4C:
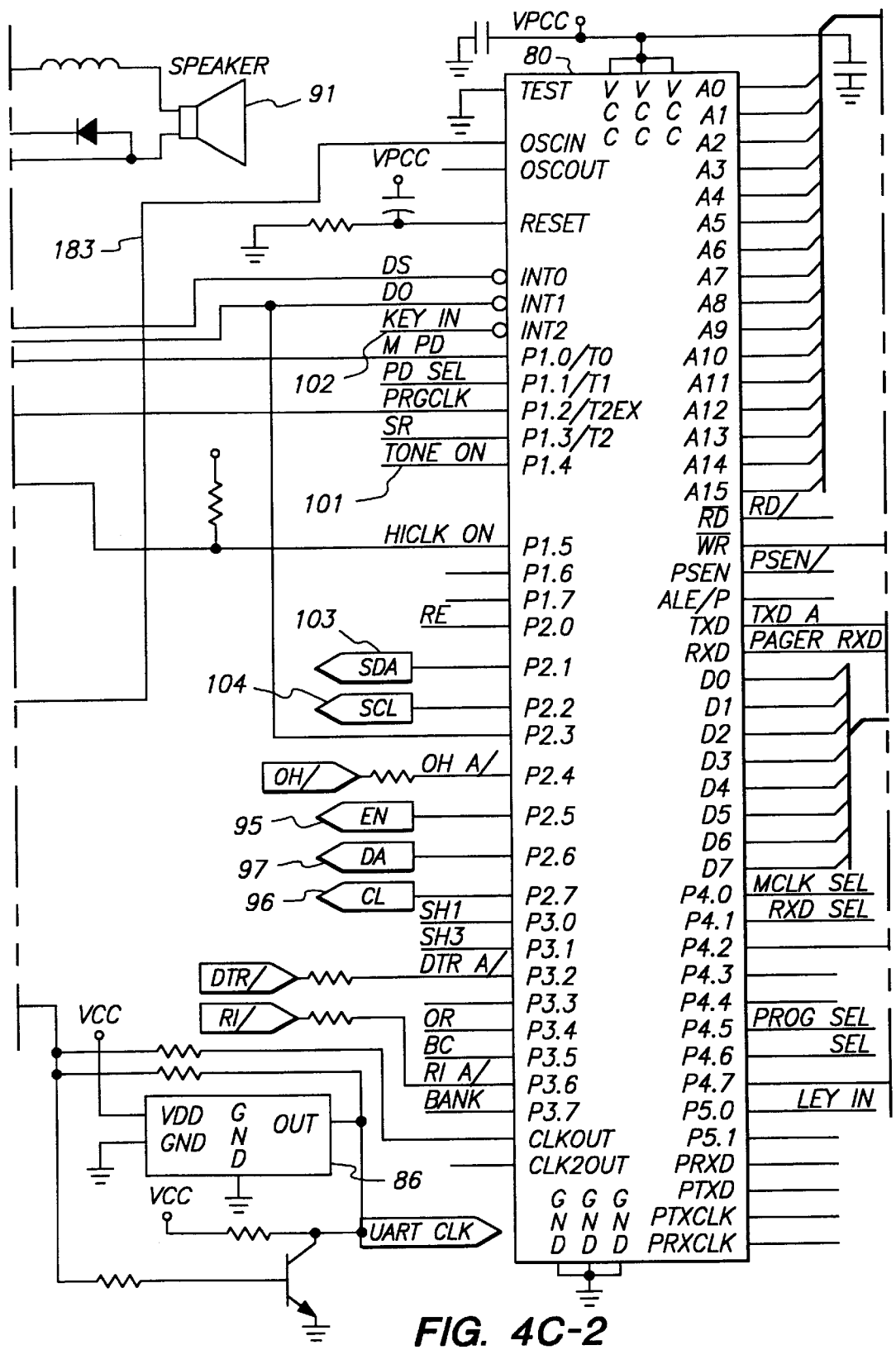
Figures 3, 4C:
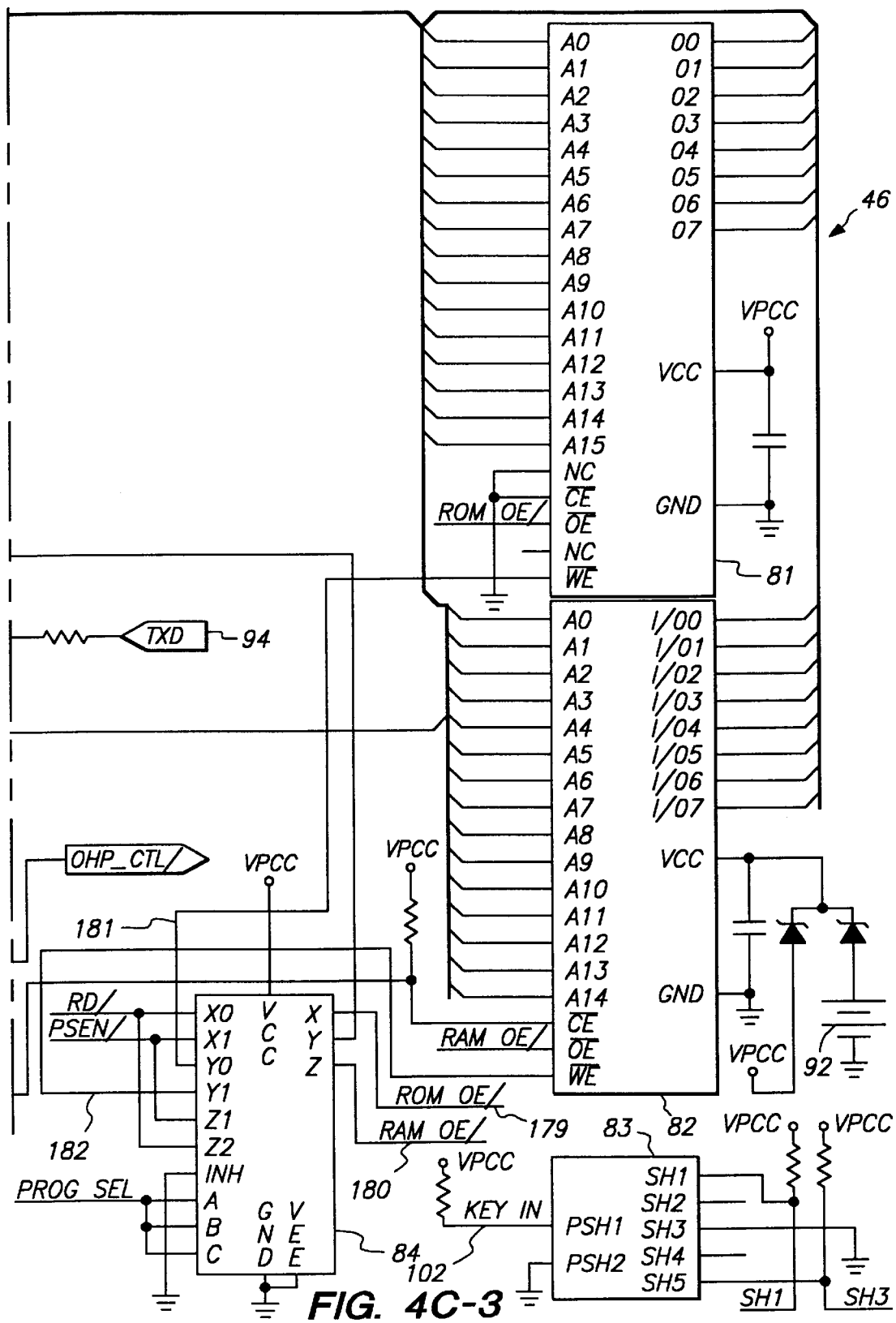

With reference to FIG. 4C, radio frequency controller 46 includes radio frequency controller circuit 80, program memory 81, data memory 82, switch 83, multiplexers 84 and 85, oscillators 86, 87 and 88, oscillator circuitry 89, decoder circuit 90, speaker 91 and battery 92.

Radio frequency controller circuit 80, which may comprise, for example, part No. K2910, available from Silicon Systems Corporation of Tustin, Calif., executes firmware loaded in program memory 81, which may comprise a 64 kilobyte flash electrically-erasable programmable read-only memory, such as part No. 29C512, available from Atmel Corporation of San Jose, Calif.

Decoder circuit 90, which may comprise, for example, part No. PCF5001, available from Philips Semiconductor Corporation of Sunnyvale, Calif., implements the widely-used Post Office Code Standardization Advisory Group (POCSAG) protocol at data rates of 512, 1200, and 2400 baud to analyze the incoming signals to determine whether a received transmission is intended for the user. Decoder circuit 90 also serves a power management function by generating a signal controlling voltage regulator circuit 77.

An incoming message data is stored in data memory 100, which may comprise, for example, a 32 kilobyte static random access memory (SRAM) such as part No. CXK58257ATM-70L (expandable to 128 kilobytes), available from Sony Corporation of America, Component Products Division, Cypress, Calif. Once a complete message is stored, oscillator circuitry 89, for example, part No. 74HCT00, available from National Semiconductor Corporation of Santa Clara, Calif., generates a tone signal, which is played out through speaker 91 to alert the user of the presence of the message. Battery 92 powers data memory 82 when main battery power is unavailable.

The user, by sliding switch 83 to the momentary position, may scroll through stored messages on display 40, which may comprise, for example, display driver circuitry such as part No. PCF8566, available from Philips Semiconductor Corporation of Sunnyvale, Calif. and a 12 character LCD such as those available from Seiko Instruments Corporation of Torrance, Calif.

Multiplexer 84, which may comprise for example part No. 74HCT4053, available from National Semiconductor Corporation of Santa Clara, Calif. is employed in updating the firmware stored in program memory 81, during which radio frequency controller circuit temporarily executes instructions from data memory 82, as described hereinbelow.

Multiplexer 85, which may also be part No. 74HCT4053, is employed in power management in combination with oscillators 87 and 88, which operate at frequencies of 7.3 MHz and 76.8 KHz, respectively. Multiplexer 85 switches from oscillator 87, used during active operation of the radio frequency circuit, to oscillator 88 to reduce power consumption of the radio frequency circuit when radio frequency circuit 36 is in a quiescent state.

Oscillator 86 generates a clock signal at 1.8432 MHz which is provided to the universal asynchronous receiver/transmitter (described with respect to FIG. 4G) for use in performing various communications tasks.

III. Radio Frequency Circuit Operation

As described heretofore, the user may program channel selections into data communication device 10, using any convenient user interface. For example, the user may program data communication device 10 by selecting a channel number between 1 and 120 using a keypad (not shown) mounted on the data communication device 10, or the data interface of the connected host, for example the keyboard of notebook computer 12 in FIG. 1A. Other suitable interfaces, such as a mouse, a trackball, a touch screen, a light pen and light-sensitive computer screen, or a pen-based digitizing computer screen, may also be used.

Host 12 executes suitable software that presents the user with an opportunity to select the desired radio frequency channel. For example, the user may select a channel from a menu or may input the channel in response to a query by the host. Menus may be updated using a database that reflects the availability of channels, both nationally and internationally, that may be received using receiver 48. If desired, the host may list the channel selections available based on the present location of the user.

With respect to FIGS. 4A–4C, after the user makes a channel selection, host 12 passes the selection to data communication device 10 as a frequency-change control command. As shown in FIG. 4A, frequency-change control commands are passed to radio frequency controller 46 by the PCMCIA interface 50 along TXD signal line 93. When the radio frequency controller 46 recognizes the frequency-change control command, radio frequency controller 46 instructs receiver 48 to update the channel selection.

Radio frequency controller circuit 80 monitors TXD terminal 94 to determine whether the user desires to update a channel selection. When a frequency-change control command is detected at TXD terminal 94, radio frequency controller circuit 80 enables voltage controlled oscillator circuitry 66 by generating an enable signal at EN terminal 95. Radio frequency controller circuit 80 clocks control data into voltage controlled oscillator circuitry 66 by generating a suitable clock signal at CL terminal 96. The channel selection control data necessary to direct voltage controlled oscillator circuitry 66 to tune to the channel identified by the frequency-change control command is generated by radio frequency controller circuit 80 and output at DA terminal 97.

Radio frequency circuitry 36 can monitor a single channel or can be directed to scan between a number of channels. For example, radio frequency controller circuit 80 may send channel selection control data to voltage controlled oscillator circuitry 66 that causes receiver 48 to alternate between two channels. At each channel, signals received by receiver 48 are demodulated by demodulator 74, which supplies demodulated digital information corresponding to received pager or e-mail messages to the radio frequency controller 46 via DI output terminal 75. Because only a single receiver is used, the data communication device is less costly than if two separate receivers were used.

All radio frequency incoming messages are preceded by a 576 bit header of alternating high and low bits, known as a "dotting pattern". At 2400 baud, the header is approximately 240 ms in length. After the dotting pattern, messages contain an address signal known as a "capture code" or "capcode". Decoder circuit 90 analyzes the incoming bit stream of digital information applied to DI input terminal 98 to determine whether the incoming capcode corresponds to a capcode assigned to the user.

When decoder circuit 90 identifies an incoming message addressed to the user, the incoming message is sent to radio frequency controller circuit 80 along DO signal line 99. DS signal line 100 carries a corresponding clock signal. The signals on the DO and DS signal lines 99 and 100 are radio frequency controller circuit interrupts. If more than one channel is being scanned, radio frequency controller circuit 80 freezes the channel frequency of receiver 48 when those signals are received, so that the remainder of the message can be received on that channel. It is also possible to provide circuitry that generates an interrupt for the radio frequency controller circuit 80 when a dotting pattern is detected (for example, after approximately 20 bits of the dotting pattern have been received). Upon receiving such an interrupt, radio frequency controller circuit 80 freezes the channel frequency of receiver 48 to ensure that decoder circuit 90 receives the capcode. If the capcode does not indicate that the message is addressed to the user, radio frequency controller circuit 80 directs receiver 48 to switch to the next channel to be scanned.

Radio frequency controller circuit 80 stores the incoming message data in data memory 82 via DO signal line 99. When the complete message has been stored in data memory 82, radio frequency controller circuit 80 takes TONE_ON signal line 101, which is normally low, to a logic high. The high signal on TONE_ON signal line 101 causes oscillator circuitry 89 to generate a tone signal, causing speaker 91 to produce an audible beep that will be sensed by the user.

In addition to storing the content of the incoming message, radio frequency controller circuit 80 also updates a corresponding table contained within data memory 82 that contains the number and type of messages that have been received. Radio frequency controller circuit 80 determines whether the incoming message is a numeric or an alphanumeric message by examining bits 20 and 21 of the header preceding the message contents. If these two bits, which immediately follow the capcode, are both 0, the message is numeric, otherwise the message is alphanumeric.

Numeric messages may be retrieved even if the data communication device 10 is not connected to a host device. The user may scroll through the stored messages by repeatedly pressing switch 83 to the momentary position. When the user actuates switch 83, the signal on KEY_IN signal line 102 goes low. When radio frequency controller circuit 80 determines that KEY_IN signal line 102 is low, the message data is directed to SDA terminal 103, while clock data is directed to SCL terminal 104. These terminals connect to liquid crystal display 40. When pager messages are not being retrieved, the time may be displayed on display 40.

When a wireless e-mail message is received, radio frequency controller circuit 80 places the word "e-mail" on the display 40, which signifies to the user that an e-mail message has been received and is stored in data memory 82 for later retrieval at host 12. If more than one e-mail message is received, radio frequency controller circuit 80 places each message in a separate memory address location in data memory 82.

Whenever data communication device 10 is initially plugged into the host device, software on the host polls data communication device 10 with a standard XMODEM flag to establish communications between the host and radio frequency controller 46. TXD line 93 is used for communications from the host to radio frequency controller circuit 80 and RXD line 105 is used for communications from radio frequency controller circuit 80 to the host. After radio frequency controller circuit 80 and the host establish a communications link, radio frequency controller circuit 80 transmits messages from data memory 82 to the host, using RXD line 105.

In order to reduce power consumption by radio frequency circuitry 36, receiver 48 and radio frequency controller 46 are periodically switched to a quiescent state, in which little power is used. The circuitry may therefore be maintained in a fully "on" state for approximately 100 ms and then placed in the quiescent state for approximately 100 ms. During the period when radio frequency controller 46 is fully on, radio frequency controller circuit 80 tunes receiver 48 to the selected channel (or, if two channels are used, to one of the two channels for 50 ms and then to the other channel for 50 ms).

During the quiescent period decoder circuit 90 generates a low RE signal, which is provided to voltage regulator circuit 77 via RE terminal 106. When voltage regulator circuit 77 receives the low RE signal, the power supplied at terminals 78 and 79 is cut off. During the quiescent period, radio frequency controller circuit 80 directs multiplexer 85 to connect the 76.8 KHz output of oscillator 88 to clock input terminal 183, in place of the 7.3 MHz clock signal that is normally provided by oscillator 87 when radio frequency controller circuit 80 is fully "on". The slower clock signal received from oscillator 88 significantly reduces the power consumption of radio frequency controller circuit 80.

IV. Telephone Interface Circuitry

Figure 4D:
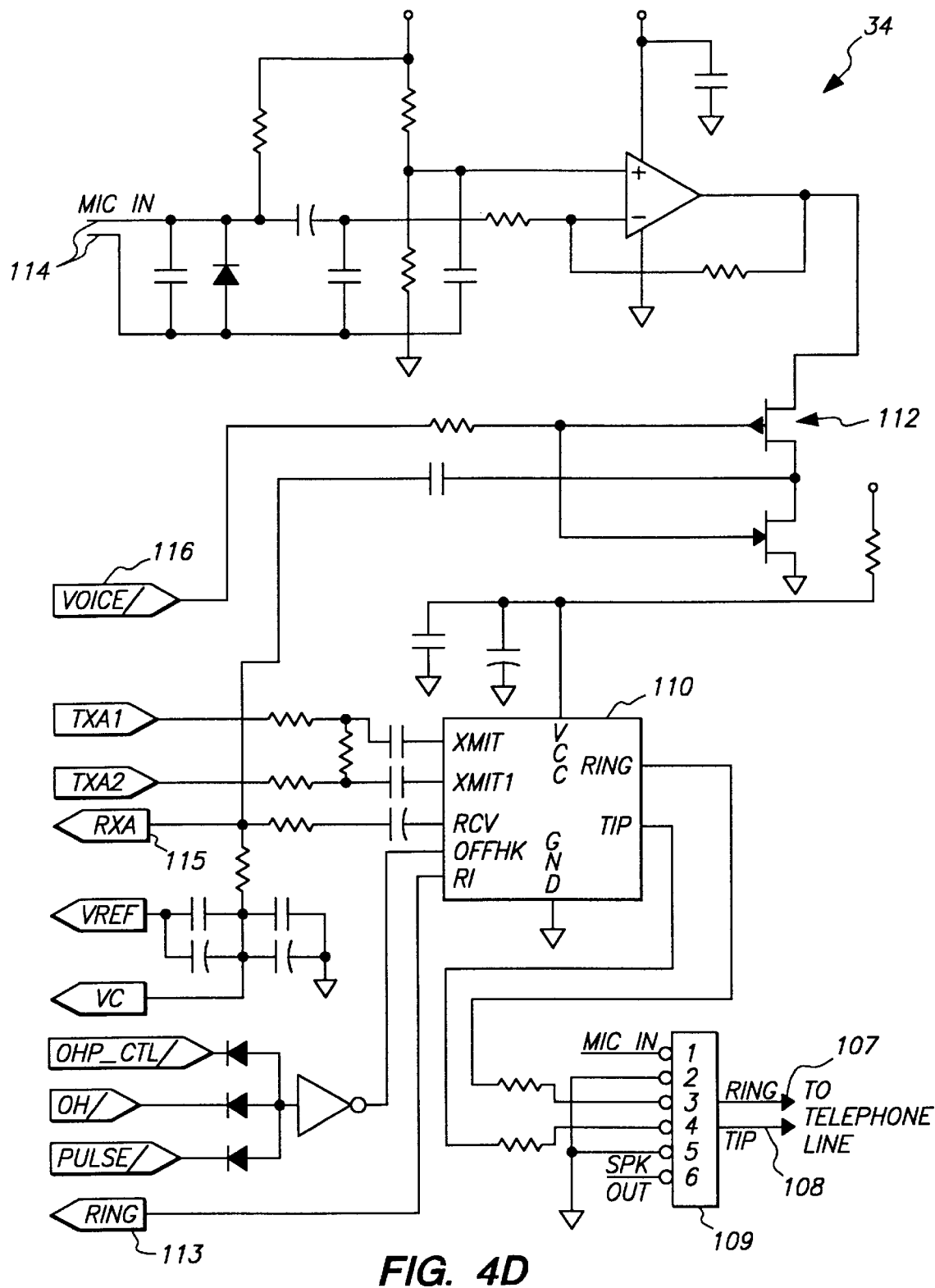

As described hereinabove, data communication device 10 supports communications via a conventional telephone line. Referring to FIGS. 4A and 4D, telephone interface 34 may be connected to a telephone line at ring terminal 107 and tip terminal 108. Telephone interface 34 includes connector 109, data access arrangement ("DAA") circuitry 110, operational amplifier 111 and transistor 112. This circuitry, in conjunction with the modem circuitry described hereinbelow, enables data communication device 10 to operate in a "modem mode" (for data transfers across the telephone line) and a "voice mode" (enabling the user to use the data communication device 10 as a telephone answering machine).

DAA circuitry 110 comprises a conventional telephone interface circuit containing amplifier and mixer circuitry to put analog data signals from modem data pump 44 and signals from the microphone of a telephone headset onto the telephone line. DAA circuitry 110 also allows incoming signals to be separated out and applied to a telephone headset speaker and passed to data modem pump 44.

In addition, DAA circuit 110 may provide signals to alter the state of data communication device 10. For example, if an incoming call is detected, DAA circuit 110 converts the 150 $V_{peak-to-peak}$ alternating current (AC) ring signal into a digital ring signal at ring terminal 113. This digitized ring signal may then be used to "wake up" modem circuitry 32 and host 12, as described hereinbelow.

Telephone interface 34 allows input of a MIC_IN signal via the microphone of a telephone headset on MIC_IN terminals 114. The MIC_IN signal is passed to the modem data pump 44 on RXA terminal 115 via operational amplifier 111 and transistor 112. Operational amplifier 111 may comprise, for example, part No. TLC27M2, available from Texas Instruments Corporation of Dallas, Tex. Voice signals may also be received over the telephone line by telephone interface 34, for example, in "voice mode", via VOICE terminal 116.

V. Interface Circuitry

Figures 1, 4E:
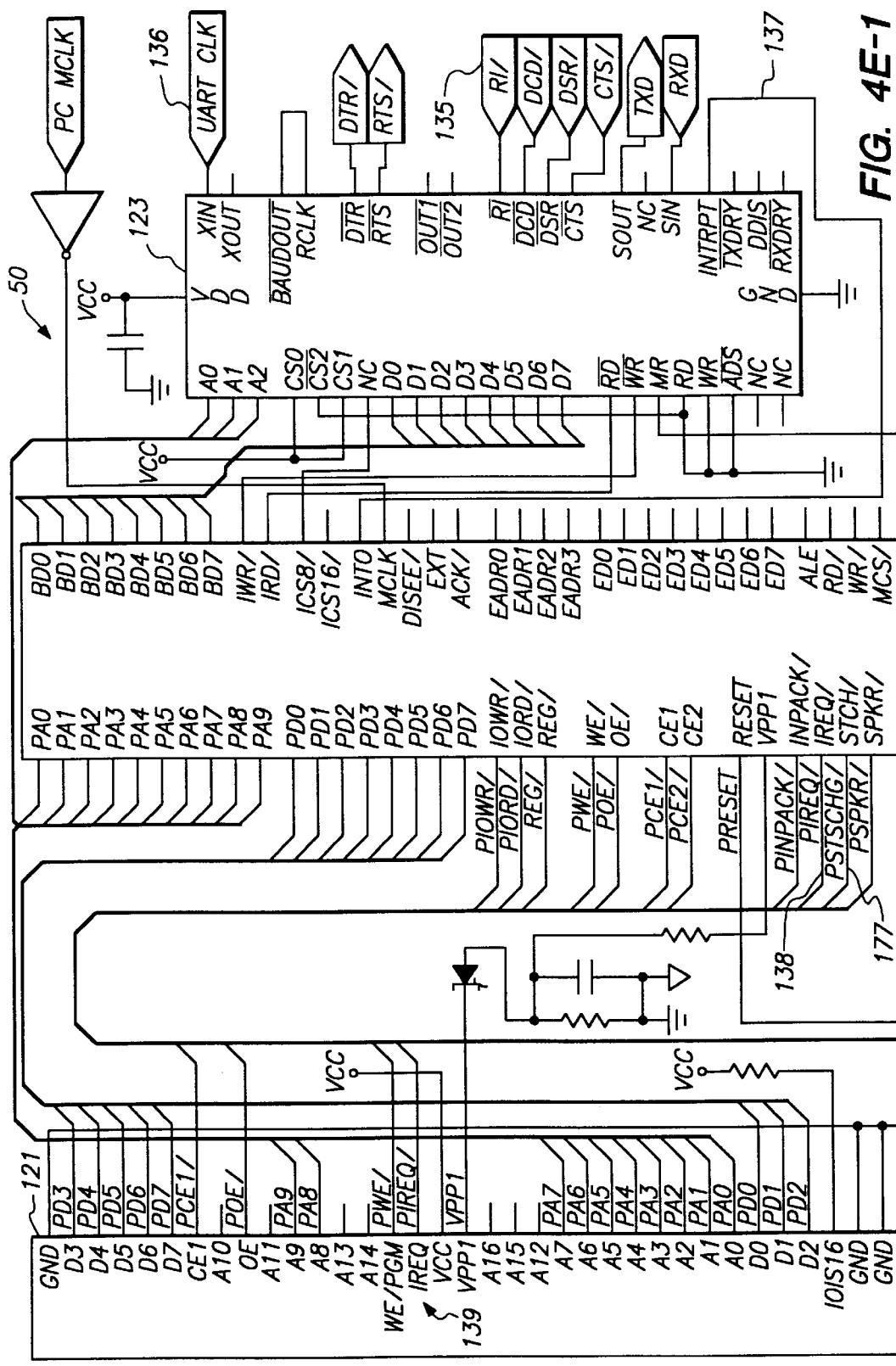

With reference to FIGS. 4A and 4E, PCMCIA interface coupling data communication device 10 to a host device is described. PCMCIA interface 50 comprises PCMCIA interface circuit 120, 68 pin connector 121, memory 122, and UART 123.

PCMCIA interface circuit 120 may be, for example, part No. DNE5001, available from the Dr. Neuhaus Engineering company of Hamburg, Germany. On the other hand, for the illustrative embodiment of FIG. 1B, where it is desired to provide an interface for data communication device 10' that is compatible with serial port communications, PCMCIA interface circuit 120 may be replaced with any suitable serial interface circuit, such as RS-232 interface circuit part No. LT-1138 available from Linear Technologies Corporation of Milpitas, Calif.

Memory 122, which may comprise, for example, a 1K×1 EEPROM, such as part No. 93C46, available from Atmel Corporation, is used to store information such as the name of the manufacturer and specific features of the data communication device.

68 pin connector 121 connects PCMCIA interface circuit 120 with the host and is preferably compatible with the Type II Personal Computer (PC) Card specification, for example, part No. 176897-1, available from AMP Corporation of Harrisburg, Pa.

Universal asynchronous receiver transmitter (UART) 166 performs various communications tasks, which are per se known, and may comprise, for example, part No. 16550, available from Silicon Systems Corporation of Tustin, Calif.

VI. Modem Circuitry

A. Modem Data Pump

Figures 1, 4F:
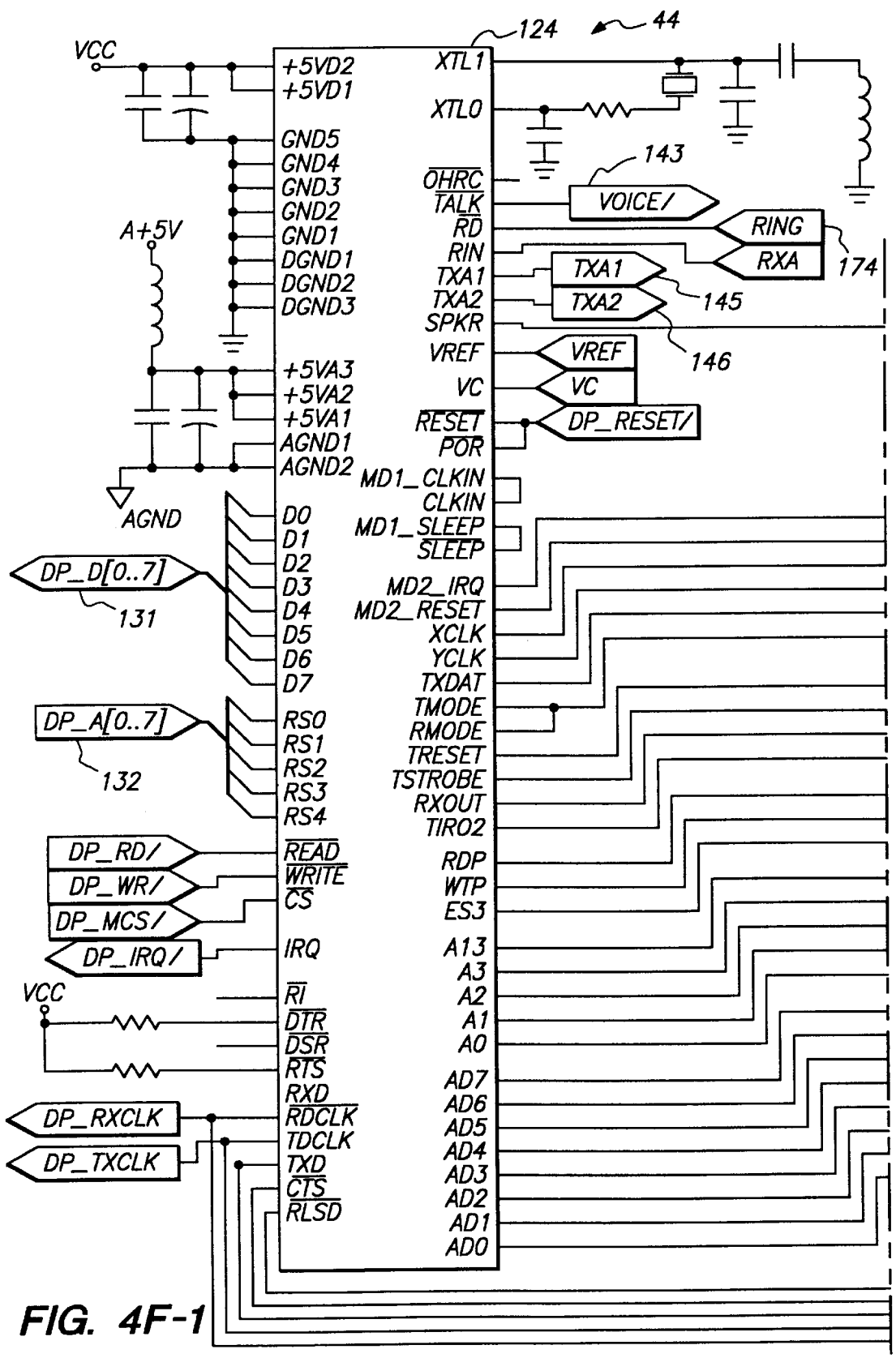
Figure 4F:
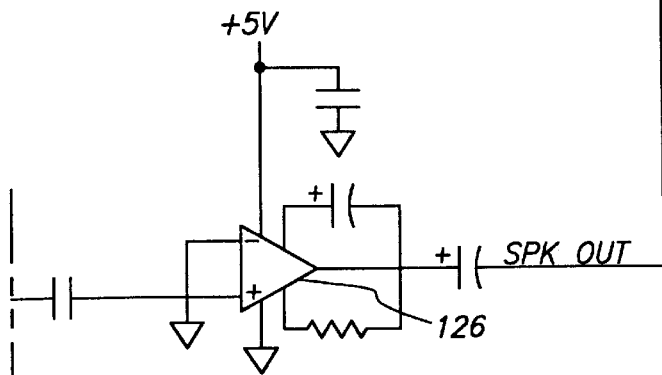
Figure 2:
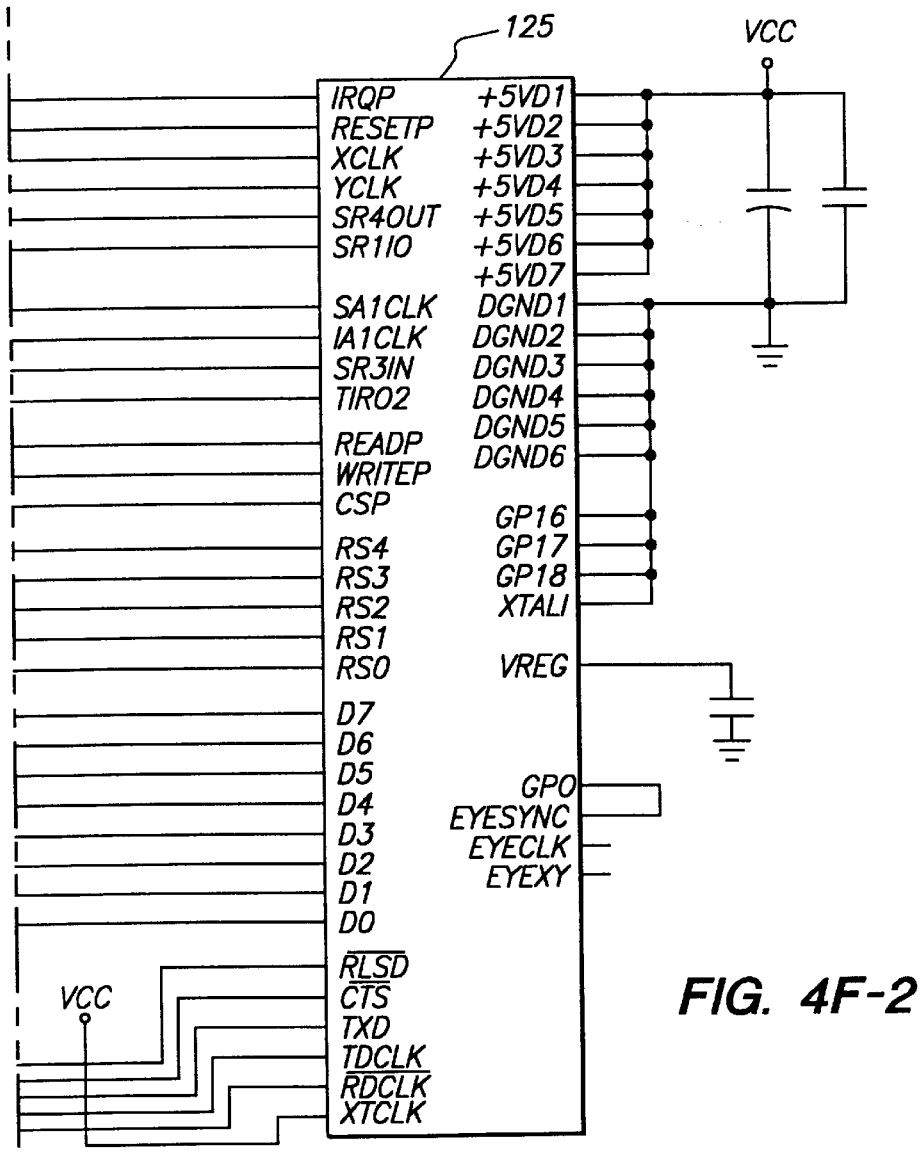

Referring now to FIGS. 4A and 4F, modem data pump 44 is coupled to the telephone line via telephone interface 34 on RXA terminal 117. The modem data pump converts analog signals from telephone interface 34 into digital signals that can be processed by host 12. Modem data pump 44 therefore provides analog to digital (A/D) and digital to analog (D/A) conversion, filtering, and equalization.

Modem data pump 44 includes modem data pump circuit 124, digital signal processor 125 and audio amplifier 126. Modem data pump circuit 124 and digital signal processor 125 may both be, for example, part No. RCV144ACL-U, available from Rockwell International Corporation, Newport Beach, Calif.

Audio amplifier 126, through which messages retrieved from storage may be played back, may comprise, for example, part No. LM386, available from National Semiconductor Corporation, Santa Clara, Calif.

B. Modem Controller

Figures 1, 4G:
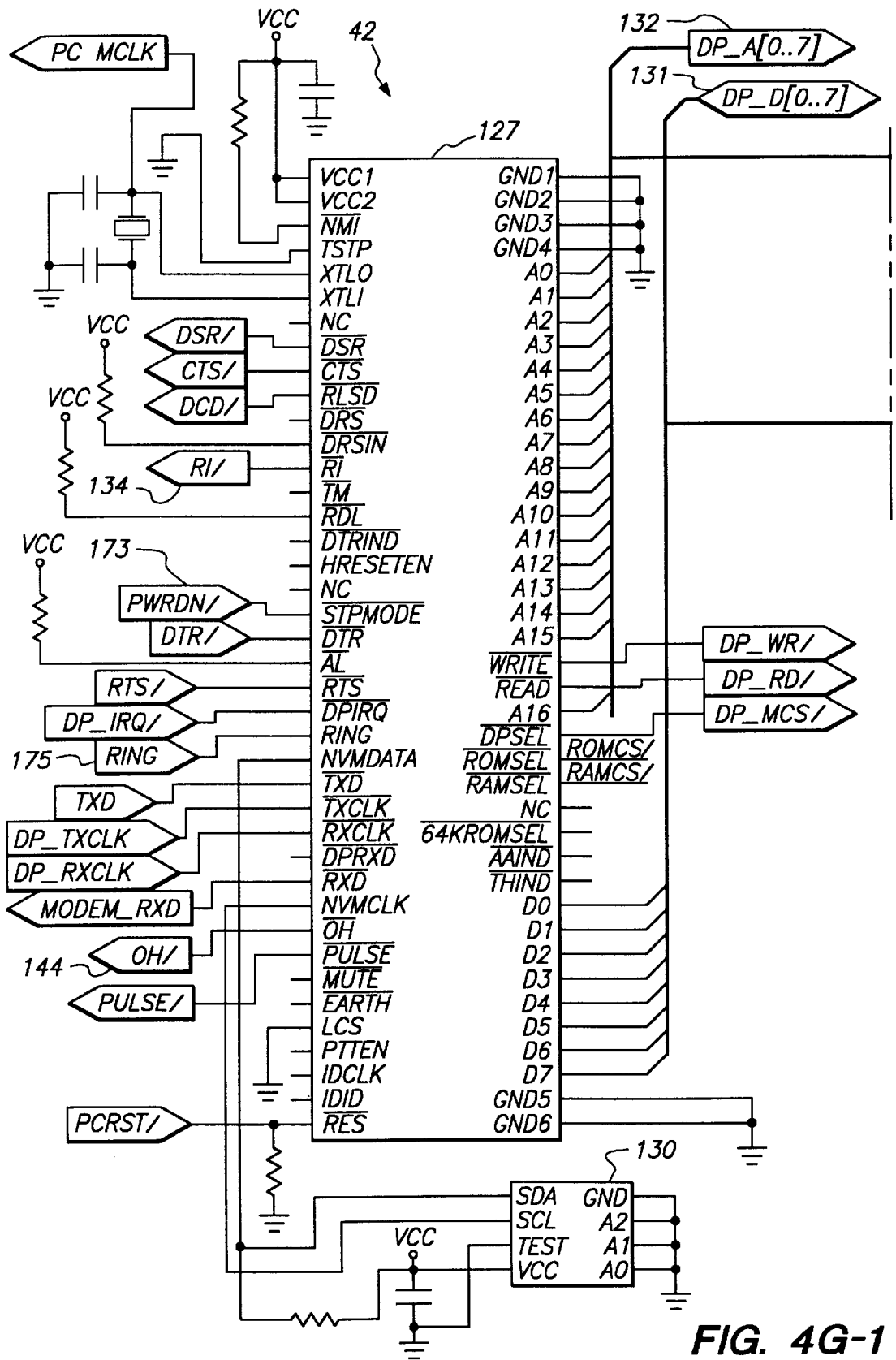
Figures 2, 4G:
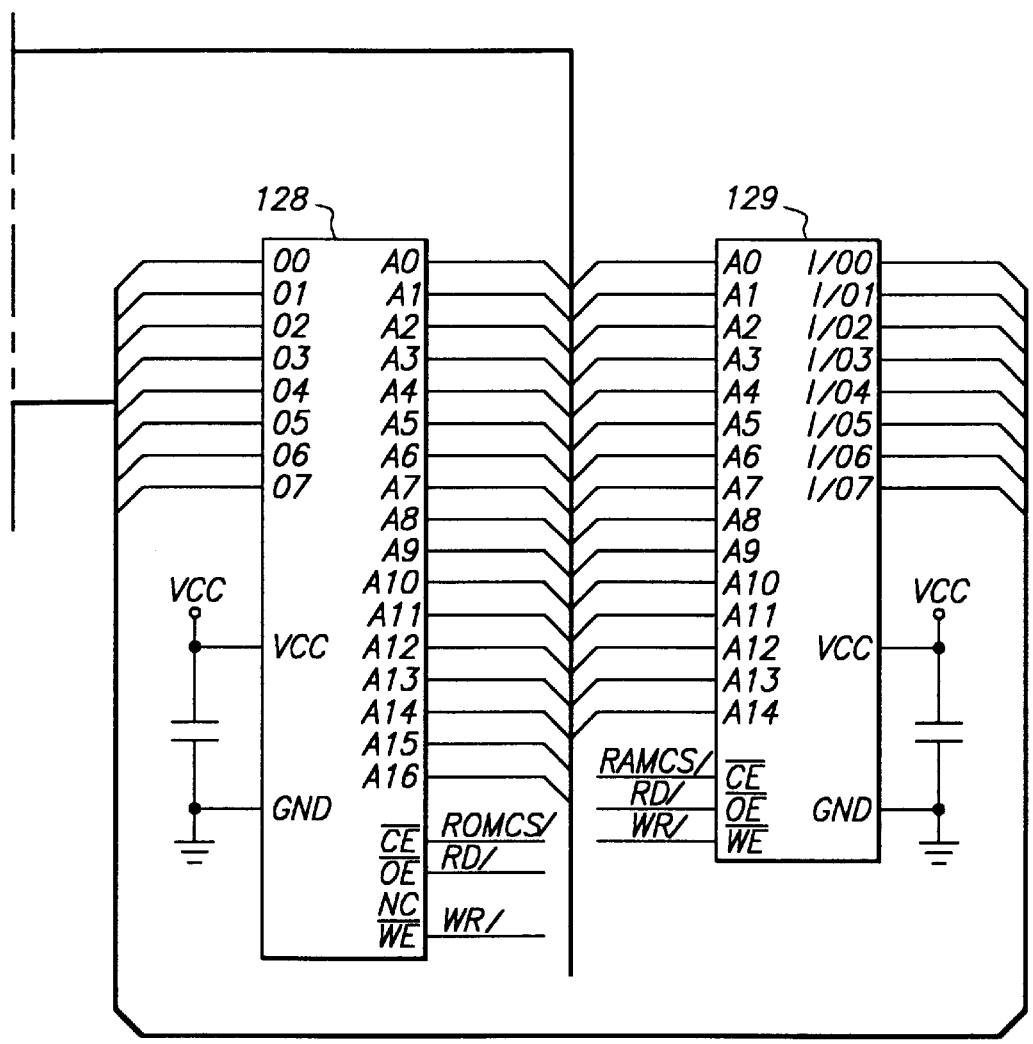
Figure 4G:
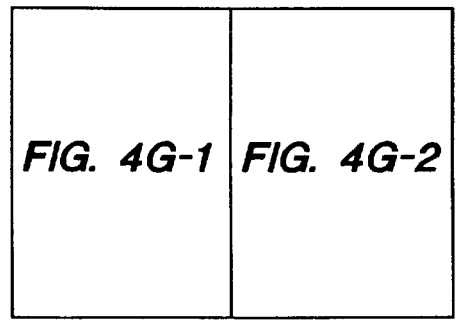

With respect to FIGS. 4A and 4G, modem controller 42 provides data buffering, handshaking, decoding, dialing and other control functions. Modem controller 42 comprises modem controller circuit 127, program memory 128, buffer memory 129 and modem configuration store 130.

Modem controller circuit 127, which may be, for example, part No. RCV144ACL-U, executes firmware contained within program memory 128. Program memory 128 may comprise a 128 kilobyte flash electrically erasable programmable read-only memory such as part No. 29C010, available from Atmel Corporation of San Jose, Calif.

Buffer memory 129 is used to buffer data when modem controller 42 mediates communications between the host and modem data pump 44. Memory 129 is a 32 kilobyte static RAM circuit, for example, part No. CXK58257ATM-70, available from Sony Corporation of America, Component Products Division, Cypress, Calif.

Modem configuration store 130 stores the configuration of the modem and is preferably a 2K×1 electrically erasable programmable read-only memory circuit (EEPROM), for example, part No. X24C16N, available from Atmel Corporation of San Jose, Calif.

VII. Operation Of Modem Circuitry

Referring now to FIGS. 4A and 4D–G, operation of the modem circuitry is described. Digital data from modem data pump 44 is passed to memory 129 of modem controller 42 via DP_D[0 . . . 7] data lines 131 and DP_A[0 . . . 4] address lines 132. Modem controller 42 in turn passes this data to radio frequency controller 46 via MODEM_RXD line 133. Multiplexer 85 of radio frequency controller 46 passes either the modem data or data from receiver 48 to PCMCIA interface 50 using RXD line 105.

The host device is alerted when there is an incoming call via PCMCIA interface 50. When an incoming call is detected, DAA circuitry 110 generates a ring signal. Modem controller circuit 127 receives the ring signal and generates a corresponding "RI" signal at RI terminal 134. The RI signal is received at RI terminal 135 of UART 123. UART 123 also receives a clock signal at terminal 136 from oscillator 86 of the radio frequency circuit of FIG. 4C.

In response to receiving the RI signal at RI terminal 135, UART 123 generates an INTRPT signal on INTRPT line 137. The INTRPT signal is converted by PCMCIA interface circuit 120 to a format that can be accepted by the host device. The converted signal is provided at PIREQ terminal 138, which is connected to IREQ pin 139 of connector 121. The host can then monitor IREQ pin 139 to determine if there is an incoming modem message (data or facsimile), or an incoming telephone call.

A. Modem Mode

The host device may implement routines that allow it, in combination with and data communication device 10, to provide a "modem mode" by receiving or sending data transfers via modem, using communications procedures which are per se known. As noted hereinabove, data is transmitted between the host and modem controller 42 using PCMCIA interface 50.

In particular, data is transmitted to the modem controller 42 by the host on TXD line 140, while the host receives data from modem controller 42 using RXD line 105. Data is transmitted between modem controller 42 and modem data pump 44 via DP_D[0 . . . 7] data lines 131 and DP_A[0 . . . 4] address lines 132. For modem communications, modem data pump 44 uses the well-known quadrature amplitude modulation (QAM) technique. QAM signals from modem data pump 44 are provided to telephone interface 34 via lines 141 and 142. Telephone interface 34 places QAM signals across ring terminal 107 and tip terminal 108.

The modem circuitry of data communication device 10 of the present invention may be suitably programmed to support various industry standard modem protocols, such as the modulation standards V.32bis, V.32, V.22bis, V.22, V.23, V.21, set by the Consultive Committee on International Telephone and Telegraph (CCITT), and the well-known Bell 212A and Bell 103 modulation standards. Modem circuitry 32 may support line data rates of 14.4 Kbps, 12 Kbps, 9.6 Kbps, 7.2 Kbps, 4.8 Kbps, 2.4 Kbps, 1.2 Kbps, and 300 bps, and allow for both hardware and software flow control. In addition, data communication device 10 may include programming to support Microcom MNP-2, MNP-3, and MNP-4 and CCITT V.42 error correction protocols. Both CCITT V.42bis and Microcom MNP Class 5 data compression standards may be supported.

Further, the modem circuitry of data communication device 10 may be programmed using conventional techniques to support facsimile communications at 14.4 Kbps, 9.6 Kbps, 7.2 Kbps, 4.8 Kbps, 2.4 Kbps, and 300 bps following the CCITT V.17, V.29, V.27ter, and V.21 specifications. Both hardware and software flow control may be supported for facsimile communications.

B. Voice Mode

The host may also implement routines that allow it, in combination with data communication device 10, to provide a "voice mode", wherein the host and data communication device 10 serve as a telephone for outgoing calls and also provide the functions of a telephone answering machine.

Figure 5A:
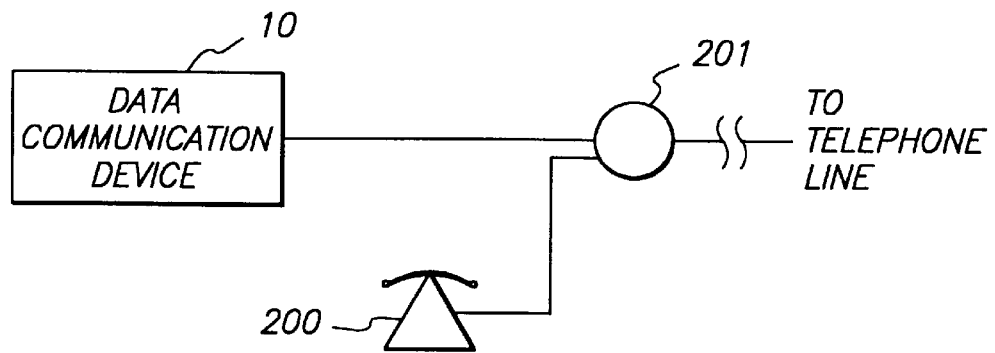
FIGS. 5A and 5B are, respectively, schematic block diagrams of the data communication device of the present invention connected to a conventional telephone set and a telephone headset suitable for use with the present invention.
Figure 5B:
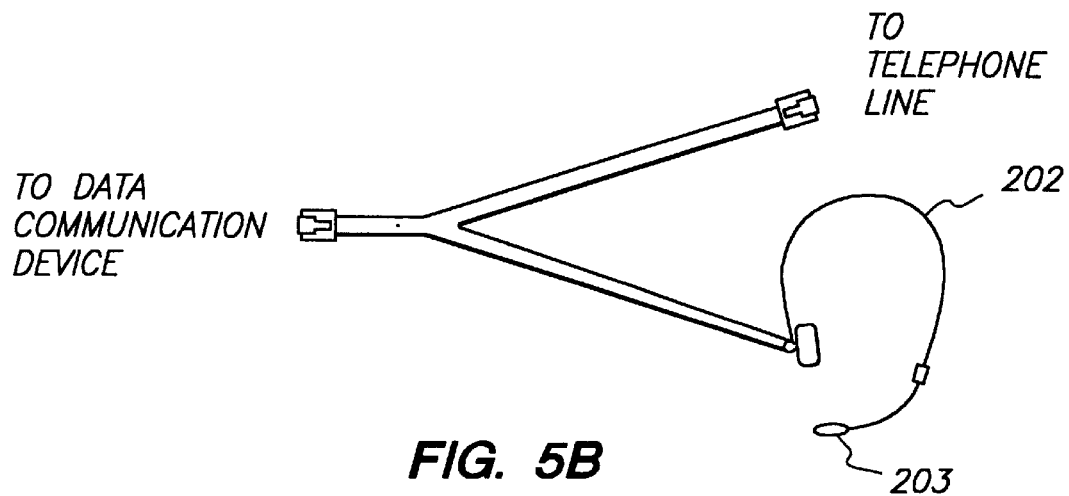

If desired, data communication device 10 may be connected to a telephone line in parallel with a conventional telephone set 200 by a splitting telephone jack 201, as shown in FIG. 5A. If data communication device 10 is not communicating via the telephone line, a user may place or receive telephone calls with the conventional telephone set 200. Alternatively, a dedicated headset 202 may also be provided, as shown in FIG. 5B. If headset 202 does not have dialing circuitry, the user can use the host to direct modem circuitry 32 to dial the desired telephone number for an outgoing call.

When the host and data communication device are configured as a telephone answering machine, the host executes a routine that monitors IREQ pin 139 to determine if there is an incoming call. When an incoming call is detected, the host plays a previously recorded greeting, and then monitors for an incoming voice message.

The user records the greeting by invoking the appropriate recording function on the host device. The host then sends commands to modem data pump 44 via PCMCIA interface 50, TXD line 140, and modem controller 42. Modem data pump 44 receives these commands from modem controller 42 via DP_D[0 . . . 7] data lines 131 and DP_A[0 . . . 4] address lines 132 to place modem data pump 44 in a voice recording mode. In voice recording mode, modem data pump 44 takes VOICE terminal 143 high, which turns transistor 112 on.

As the user speaks into the telephone headset, the message is picked up by a microphone, such as microphone 203 in FIG. 5B, generating a MIC_IN signal across MIC_IN terminals 114. The MIC_IN signal is passed to the modem data pump 44 via operational amplifier 111, transistor 112, and RXA terminal 115. In the voice recording mode, modem data pump 44 digitizes the analog MIC_IN signal and transmits the digitized signals to the host for storage via DP_D[0 . . . 7 ] data lines 131 and DP_A[0 . . .4 ] address lines 132, modem controller 42, MODEM_RXD line 133, radio frequency controller 46, RXD line 105, and PCMCIA interface 50. The host device then stores the digitized greeting using any convenient data storage medium, such as a hard disk, floppy diskette, optical disk, tape drive, PC card, random access memory, or flash memory.

When the host is used for telephone answering and a call is received, modem controller 42 generates an off-hook signal at OH terminal 144 (FIG. 4G), which allows DAA circuit 110 to connect modem data pump 44 with ring and tip terminals 107 and 108. In order to play back the greeting to the caller, the host transmits commands to modem data pump 44, placing modem data pump 44 in voice mode. The host then transmits the digital form of the greeting to modem data pump 44, which converts the message to an analog signal that is placed on TXA1 and TXA2 terminals 145 and 146. Telephone interface 34 places the outgoing message on the telephone line via terminals 107 and 108. If desired, the greeting may be followed by a short audible tone, indicating that the caller is to begin speaking.

After playing the greeting, DAA circuit 110 provides the incoming analog signal present on ring and tip terminals 107 and 108 to RXA terminal 115. Modem data pump 44, which is placed in voice mode by the host, digitizes and compresses the incoming message on RXA terminal 115 and provides it to the host for storage, using the same data path used for recording the greeting, as described hereinabove.

The user retrieves messages that have been stored on the host by initiating a playback routine on the host, which causes the host to place modem data pump 44 in voice mode. The modem data pump 44 plays back the retrieved messages using audio amplifier 126. If it is desired to use the headset of the conventional telephone set 200 to listen to the messages, the headset must be powered. Typically, telephone set 200 is powered by an approximately 48 V direct current (DC) voltage signal from the local telephone office. Although it is possible to use the host or an external modem to power telephone set 200, using the telephone line to power telephone set 200 avoids potential problems such as determining what voltage is required by a particular telephone set 200.

The DC voltage from the local telephone office is provided across ring and tip terminals 107 and 108, so that telephone set 200 may be powered by taking telephone set 200 off-hook. However, unless a call is placed, the local office typically will generate a fast busy signal after the headset has been off-hook for approximately five to ten seconds. Because the fast busy signal interferes with the ability of the user to hear recorded messages, the host may be provided with a special "voice mail assistant" telephone number. When the user retrieves stored messages, the host directs the modem circuitry to dial the voice mail assistant telephone number.

The call placed by the modem circuitry may be answered by a conventional telephone answering machine that is provided specifically for that purpose. After answering the call, the telephone answering machine remains silent. Because the call is answered, the local telephone office will not generate the fast busy signal. The user may therefore retrieve messages from the host without interruption. The voice mail assistant telephone number can be provided for the benefit of the users of modem devices such as data communications device 10 and, if desired, for users of other modems that support voice mail message recording.

VIII. Power Management Circuitry

Figure 4H:
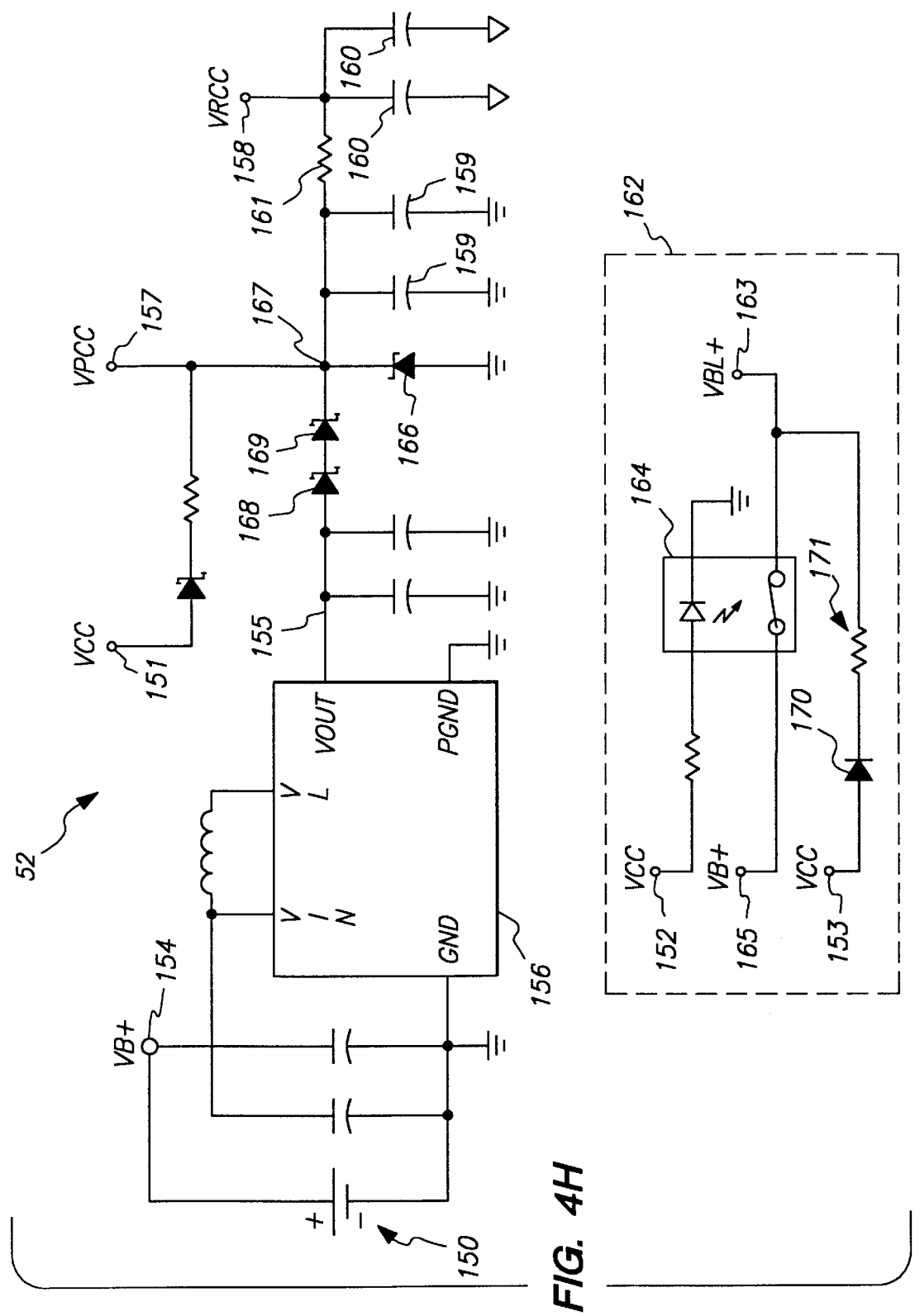

Data communication device 10 of the present invention may be powered either through the host via PCMCIA interface 50 or by its own battery. With reference to FIGS. 4A and 4H, when data communication device 10 is inserted into a PCMCIA slot, power may be supplied from the host at 5 V (VCC). When data communication device 10 is not attached to the host, however, power is supplied to some of the circuitry by battery 150, preferably a 1.5 V AA-sized battery. In order to prevent the loss of messages when battery 150 is replaced, data memory 82 of radio frequency controller 46 is backed up by battery 92.

Voltage VCC is provided from the host to PCMCIA interface 50, modem controller 42, modem data pump 44, and telephone interface 34. When data communication device 10 is removed from a PCMCIA slot, the power at VCC terminals 151, 152, and 153 is cut off, thereby shutting down PCMCIA interface 50, modem controller 42, modem data pump 44, and telephone interface 34.

Other circuitry, however, remains powered by battery 150. Because much of the circuitry of data communication device 10 operates at 3 V, power management circuitry 52 is used to adjust the various voltage levels. The 1.5 V supply at terminal 154 is stepped up to approximately 3 V at output terminal 155 by voltage conversion circuit 156 (for example, part No. ML4861, available from Micro Linear Corporation of San Jose, Calif.), raising the supply voltages at VPCC and VRCC terminals 157 and 158 to approximately 3 V. VPCC terminal 157 supplies power to display 40 and radio frequency controller 46. VRCC terminal 158 supplies power to receiver 48. Capacitors 159 and 160 and resistor 161 form a low-pass filter to isolate receiver 48 from digital noise generated by radio frequency controller 46.

Some portions of receiver 48 operate at approximately 1.0–1.5 V. Circuit 162 provides a 1.5 V supply at VBL+ terminal 163 when the voltage at terminal 152 is 0 V, because solid state switch 164 is closed when the voltage at terminal 152 is 0 V, which connects 1.5 V VB+ terminal 165 to VBL+ terminal 163.

When data communication device 10 is inserted into a PCMCIA slot, the voltage at VCC terminals 151, 152, and 153 is 5 V. Zener diode 166 holds the voltage at node 167 at approximately 3.3 V, which reverse biases diodes 168 and 169, so that battery 150 is not drawn down. Solid state switch 164 is also open, which isolates VB+ terminal 165. Under normal operating conditions, the voltage drop across diode 170 and resistor 171 is sufficient to drop the voltage at VBL+terminal 163 to approximately 1.5 V, as required.

In order to conserve the battery power of the host when data communication device 10 is connected, data communication device 10 preferably supports a "sleep" mode, in which portions of the modem circuitry "go to sleep" when not in use. For example, after a predetermined time, an internal timer in modem controller 42 causes modem controller 42 to power down. Alternatively, the host may instruct modem controller 42 to power down.

Referring to FIGS. 4E–4G, when PCMCIA interface 50 receives a signal from the host to enter sleep mode, PCMCIA interface circuit 120 generates a power-down signal on PWRDN terminal 172. When modem controller 42 receives the power-down signal at terminal 173, or when the internal timer within modem controller 42 exceeds the predetermined time interval, modem controller circuit 127 sends "power-down" commands to modem data pump circuit 124, which direct modem data pump 44 to go to sleep. After transmitting the power-down commands to modem data pump 44, modem controller 42 also goes to sleep. While asleep, modem controller 42 and modem data pump 44 draw essentially no power. The remaining circuits, such as memory 128 and memory 129 in modem controller 42, PCMCIA interface 50, and telephone interface 34, consume little quiescent power.

The host device may itself support a sleep mode, in which, after a predetermined time with no user activity, it goes to sleep. If an incoming call is detected, DAA circuit 110 converts the 150 $V_{peak-to-peak}$ alternating current (AC) ring signal into a digital ring signal at ring terminal 113, which is used to "wake up" the modem circuitry and the host device. When the digital ring signal is received at ring terminal 174 of modem data pump circuit 124, modem data pump 44 wakes up. Similarly, when the digital ring signal is received at ring terminal 175 of modem controller circuit 127, modem controller 42 wakes up.

PCMCIA interface circuit 120 also receives the ring signal at ring terminal 176 and in response takes the PSTSCHG signal at PSTSCHG terminal 177 low. The PSTSCHG signal is provided to the host at STSCHG terminal 178 of connector 121. If the host supports a "sleep" mode, the host wakes up when a low PSTSCHG signal is received.

IX. Updating Of Device Firmware

In accordance with the present invention, the firmware instructions executed to control the modem, pager and e-mail functions of data communication device may be updated to provide new modem, paging, or e-mail functions or to improve the operation of the functions as initially provided. Firmware may be updated by using the host device to download a more recent version of the firmware from a diskette, by downloading new firmware using modem circuitry 32, or by downloading via radio frequency circuitry 36.

If the host is used to download a new version of the firmware, it is contemplated that the user would be provided with the new version on a diskette or other suitable storage medium. Software on the host establishes communications with the control circuitry on data communication device 10. If the control circuitry consists of a single controller (microprocessor or microcontroller), the host may establish communications with that controller. If data communication device 10 contains more than one controller, the host may communicate with the controller that is to use the new firmware.

For example, data communication device 10 of the embodiment of FIG. 1B may contains modem circuitry 32 and radio frequency circuitry 36, each of which may contain a dedicated controller. To update the firmware that radio frequency circuitry 36 executes, the host establishes communications with radio frequency controller circuit 80. During operation, radio frequency controller circuit 80 executes firmware stored in program memory 81. In order to update the firmware in program memory 81, the host and radio frequency controller circuit 80 communicate via TXD line 140 and RXD line 105, as described hereinabove.

To determine whether the firmware code available to the host actually represents a more recent version of the firmware than what is already loaded in program memory 81, the version number of the currently loaded firmware, may be stored in program memory 81, and compared with the version number of the updating firmware. If the host has a newer version of the firmware, it transmits the newer version to data communication device 10 via TXD line 140. The appropriate controller, such as radio frequency controller circuit 80, initially stores the new version in data memory 82.

Referring again to FIG. 4C, in normal operation radio frequency controller circuit 80 will execute the instructions loaded into program memory 81, while data memory 82 is used to store data. However, during the process of updating the firmware, radio frequency controller circuit 80 toggles multiplexer 84, to switch ROM_OE line 179 and RAM_OE line 180 and to switch terminals 181 and 182. As a result, radio frequency controller circuit 80 temporarily executes the instructions in data memory 82, rather than in program memory 81. Updating instructions in data memory 82, which were transmitted with the new firmware, direct radio frequency controller circuit 80 to load the new firmware from data memory 82 into program memory 81, thereby updating the firmware for radio frequency controller 46. After program memory 81 has been updated, the updating instructions in data memory 82 direct radio frequency controller circuit 80 to run a reinitiation routine, during which multiplexer 84 is returned to its initial setting. After running the reinitiation routine, the updating of the firmware of radio frequency circuitry 36 is complete.

In addition to updating the radio frequency circuitry firmware by downloading the new version from the host, the new firmware may be downloaded remotely, i.e., wirelessly, using radio frequency circuitry 36. The new firmware can be broadcast on one or more e-mail channels, preferably over a sufficiently wide geographical area to ensure that most users of data communication device 10 will be able to receive the new version when it is broadcast. A "group call" capcode can be used to address all of the users of data communication devices 10 simultaneously. The message containing the new firmware is headed by beginning and ending memory addresses or by a beginning address and the message size, to define the location in data memory where the new firmware instructions are to be loaded.

The updating message is received by antenna 38 and demodulated by receiver 48. The updating message is passed to radio frequency controller 46, which receives the incoming data via terminal 98, as described hereinabove. Decoder circuit 90 recognizes the group call capcode, which allows radio frequency controller circuit 80 to receive the memory addressing information contained at the front of the incoming data stream. Using this addressing information, radio frequency controller circuit 80 can place the portion of the incoming message that corresponds to the new version of the firmware in the appropriate location in data memory 82.

Preferably, the updating message contains standard error checking codes, such as a cyclic redundancy check (CRC) signal and a check-sum signal, followed by an appropriate termination code. Radio frequency controller circuit 80 performs error correction calculations to ensure that no errors are present in the new code. If an error is detected, data memory 82 is cleared. If no errors are detected, the new instructions are loaded into program memory 81, as described in connection with downloading firmware from the host.

If it is desired to update the modem circuitry firmware, a circuit arrangement containing a multiplexer similar to multiplexer 84 may be added to modem circuitry 32, thereby allowing the user to update the modem circuitry firmware by shifting the firmware into memory 129 and subsequently loading these instructions into memory 128.

If only one controller is used to provide the functions of both modem circuitry 32 and radio frequency circuitry 36, the user need only update the firmware in the single memory that is connected to that controller. By using a single controller, the task of updating firmware is simplified somewhat, because firmware that affects both the operation of modem circuitry 32 and radio frequency circuitry 36 can be simultaneously updated.

Further, it is possible to load new firmware instructions into memory using modem circuitry 32, in a manner similar to that described in connection with wireless downloading of an update. If modem circuitry 32 is used, users preferably initiate downloading by establishing a modem communications link with a central computer system that is capable of transmitting the updated firmware.

It will be understood that the foregoing is merely illustrative of the principles of this invention, and that various modifications can be made by those skilled in the art without departing from the scope and spirit of the invention.

The invention claimed is:

1. A data communication device comprising:
   radio frequency circuitry which comprises:
   an antenna for receiving radio frequency signals;
   a radio frequency receiver which is tunable between multiple channels, the radio frequency receiver being coupled to the antenna, and demodulating the radio frequency signals into digital information corresponding to a message;
   decoder means coupled to the radio frequency receiver for determining whether the message is addressed to a particular user;
   a first data memory, in which messages are stored when the decoder means determines that the message is addressed to the user;
   radio frequency controller means for controlling the radio frequency receiver, providing channel selection control to the radio frequency receiver, and for determining whether the messages stored in the first data memory comprise a pager message, an alphanumeric e-mail message, or an update message containing firmware that replaces pre-existing firmware in the data communication device;
   a first program memory in which firmware is loaded to provide operating instructions for the radio frequency controller means;
   multiplexer means for switching the radio frequency controller to read its operating instructions from the first data memory while firmware from the first data memory is loaded into the first program memory; and
   means for periodically placing the radio frequency circuitry into a quiescent mode;
   telephone interface circuitry for connecting the data communication device to a telephone line;
   modem circuitry which comprises:
   modem data pump circuitry for transmitting and receiving voice, facsimile communications, and data across a telephone line, the modem data pump circuitry coupled to the telephone interface circuitry, the modem data pump circuitry including analog-to-digital converters, digital-to-analog converters, and an audio amplifier, for handling voice messages;
   modem controller means for controlling the modem data pump circuitry;
   a second program memory in which firmware is loaded to provide operating instructions for the modem controller means; and
   a buffer memory for storing data being transmitted or received by the modem data pump circuitry;
   interface circuitry for coupling the communication device to a host computer and selectively permitting data to be transferred between the communication device and the host computer, the interface circuitry coupled to the modem controller means and the radio frequency controller means;
   a user interface coupled to the radio frequency circuitry, the user interface comprising a display and a control, the display showing pager messages received by the radio frequency receiver when the communication device is not coupled to a computer; and
   power supply interface circuitry for connecting the data communication device to a power supply to provide power to the communication device when it is not coupled to the computer.

2. The data communication device of claim 1, wherein the telephone interface circuitry includes means for preventing the local telephone office from generating a fast busy signal.

3. The data communication device of claim 1, wherein the interface circuitry includes a means for powering the data communication device when the data communication device is coupled to the host computer.

4. The data communication device of claim 1, wherein the power supply interface means includes a means for placing the communication device into a power-conserving sleep mode.

5. The data communication device of claim 1, wherein the buffer memory of the modem circuitry may store messages containing firmware that replaces pre-existing firmware in the data communication device, and the modem circuitry includes multiplexer means for switching the modem controller to read its operating instructions from the buffer memory while firmware from the buffer memory is loaded into the second program memory.

6. The data communication device of claim 1, wherein the interface circuitry conforms to a specification for a PCMCIA interface.

7. The data communication device of claim 1, wherein the data communication device comprises a housing having a portion conforming to a mechanical specification for PCMCIA cards.

8. The data communication device of claim 7, wherein the control comprises a three position switch disposed on a lateral face of the housing.

9. The data communication device of claim 7, wherein the user display is an LCD display that displays pager messages.

10. The data communication device of claim 7, wherein the data communication device comprises an RJ-11 telephone jack disposed on a lateral face of the housing, the RJ-11 telephone jack coupled to the telephone interface circuitry.

11. The data communication device of claim 7, wherein the housing comprises a compartment, and the power supply interface circuitry is disposed within the compartment.

12. A data communication device comprising:
   radio frequency circuitry which comprises:
   an antenna for receiving radio frequency signals;
   a radio frequency receiver which is tunable between multiple channels, the radio frequency receiver being coupled to the antenna, and demodulating the radio frequency signals into digital information corresponding to a message;

decoder means coupled to the radio frequency receiver for determining whether the message is addressed to a particular user; and means for saving power by periodically placing the radio frequency circuitry into a quiescent mode;

telephone interface circuitry for connecting the data communication device to a telephone line;

modem circuitry which comprises:

modem data pump circuitry for transmitting and receiving voice, facsimile communications, and data across a telephone line, the modem data pump circuitry coupled to the telephone interface circuitry, the modem data pump circuitry including analog-to-digital converters, digital-to-analog converters, and an audio amplifier, for handling voice messages;

means for placing the modem circuitry into a power-conserving sleep mode, a data memory for storing messages received by the radio frequency receiver, and for storing messages being sent or received by the modem data pump circuitry;

controller means for controlling the modem data pump circuitry, for controlling the radio frequency receiver, and for determining whether data received in the data memory is voice data, facsimile data, modem data, a pager message, an alphanumeric e-mail message, or an update message, containing firmware that replaces pre-existing firmware in the data communication device;

a program memory in which firmware is loaded to provide operating instructions for the controller means;

multiplexer means for switching the controller means to read its operating instructions from the data memory while firmware from the data memory is loaded into the program memory;

interface circuitry for coupling the communication device to a host computer and selectively permitting data to be transferred between the communication device and the host computer, the interface circuitry coupled to the controller means;

a user interface coupled to the radio frequency circuitry, the user interface comprising a display and a control, the display showing pager messages received by the radio frequency receiver when the communication device is not coupled to a computer; and power supply interface circuitry for connecting the data communication device to a power supply to provide power to the communication device when it is not coupled to the computer.

13. The data communication device of claim 12, wherein the telephone interface circuitry includes means for preventing the local telephone office from generating a fast busy signal.

14. The data communication device of claim 12, wherein the interface circuitry includes a means for powering the data communication device when the data communication device is coupled to the host computer.

15. The data communication device of claim 12, wherein the power supply interface means includes a means for placing the communication device into a power-conserving sleep mode.

16. The data communication device of claim 12, wherein the interface circuitry conforms to a specification for a PCMCIA interface.

17. The data communication device of claim 16, wherein the data communication device comprises a housing having a portion conforming to a mechanical specification for PCMCIA cards.

18. The data communication device of claim 17, wherein the user display is an LCD display that displays pager messages.

19. The data communication device of claim 17, wherein the data communication device comprises an RJ-11 telephone jack disposed on a lateral face of the housing, the RJ-11 telephone jack coupled to the telephone interface circuitry.

20. The data communication device of claim 17, wherein the housing comprises a compartment, and the power supply interface circuitry is disposed within the compartment.

* * * * *